(12) United States Patent
Simard et al.

(10) Patent No.: US 12,163,792 B2
(45) Date of Patent: *Dec. 10, 2024

(54) RENDERING LOCATION AND ORIENTATION OF PUBLIC TRANSPORTATION VEHICLE ICONS WITHIN A GRAPHICAL MAP DISPLAY

(71) Applicant: Lyft, Inc., San Francisco, CA (US)

(72) Inventors: Jean-Pierre Simard, San Francisco, CA (US); Paul Theodore Beck, Seattle, WA (US); Sherzod Makhmudjanov, San Francisco, CA (US); Dorington George Little, IV, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/471,810

(22) Filed: Sep. 21, 2023

(65) Prior Publication Data

US 2024/0011780 A1 Jan. 11, 2024

Related U.S. Application Data

(63) Continuation of application No. 16/588,593, filed on Sep. 30, 2019, now Pat. No. 11,796,328.

(51) Int. Cl.
*G08G 1/123* (2006.01)
*G01C 21/34* (2006.01)
(Continued)

(52) U.S. Cl.
CPC ....... *G01C 21/343* (2013.01); *G01C 21/3438* (2013.01); *G01C 21/3614* (2013.01);
(Continued)

(58) Field of Classification Search
CPC ............. G01C 21/343; G01C 21/3438; G01C 21/3614; G01C 21/367; G06F 3/04817;
(Continued)

(56) References Cited

U.S. PATENT DOCUMENTS 11,796,328 B2 * 10/2023 Simard ................ G06Q 10/047
2012/0150436 A1 6/2012 Rossano et al.
(Continued)

OTHER PUBLICATIONS

U.S. Appl. No. 16/588,593, filed Mar. 2, 2023, Office Action.
U.S. Appl. No. 16/588,593, filed Jun. 14, 2023, Notice of Allowance.

*Primary Examiner* — Anh V La
(74) *Attorney, Agent, or Firm* — Keller Preece PLLC

(57) ABSTRACT

This disclosure describes a vehicle-icon-animation system that determines render orientations for rendering a vehicle icon to represent a public transportation vehicle traveling along a predicted route. For example, based on analyzing public transit information, the disclosed systems can determine render orientations corresponding to locations of a public transportation vehicle along a predicted route. In addition, the disclosed systems can render (or cause a client device to render) a vehicle icon to portray the public transportation vehicle pointing in different render orientations at various locations along the predicted route. Further, the disclosed systems can update the vehicle icon to render it in a new location within a graphical map display based on updated public transit information.

20 Claims, 14 Drawing Sheets

(51) Int. Cl.
  *G01C 21/36*      (2006.01)
  *G06F 3/04817*    (2022.01)
  *G06Q 10/02*      (2012.01)
  *G06Q 10/047*     (2023.01)
  *G06Q 50/40*      (2024.01)
  *G08G 1/13*       (2006.01)

(52) U.S. Cl.
  CPC ....... *G01C 21/367* (2013.01); *G06F 3/04817* (2013.01); *G06Q 10/02* (2013.01); *G06Q 10/047* (2013.01); *G06Q 50/40* (2024.01); *G08G 1/123* (2013.01); *G08G 1/13* (2013.01)

(58) Field of Classification Search
  CPC ...... G06Q 10/02; G06Q 10/047; G06Q 50/40; G08G 1/123; G08G 1/13
  USPC ........ 701/410; 340/990, 988, 991, 992, 993, 340/994, 995.1
  See application file for complete search history.

(56) References Cited

U.S. PATENT DOCUMENTS

| | | |
|---|---|---|
| 2014/0365113 A1 | 12/2014 | McGavran et al. |
| 2016/0069703 A1 | 3/2016 | Nakano et al. |
| 2017/0370735 A1* | 12/2017 | Salowitz ................ G08G 1/123 |
| 2019/0122552 A1 | 4/2019 | Chen et al. |
| 2020/0175429 A1 | 6/2020 | Beaurepaire et al. |
| 2021/0095973 A1 | 4/2021 | Simard et al. |

* cited by examiner

RENDERING LOCATION AND ORIENTATION OF PUBLIC TRANSPORTATION VEHICLE ICONS WITHIN A GRAPHICAL MAP DISPLAY

CROSS-REFERENCE TO RELATED APPLICATIONS

This application is a continuation of U.S. patent application Ser. No. 16/588,593, filed on Sep. 30, 2019. The aforementioned application is hereby incorporated by reference in its entirety.

BACKGROUND

In recent years, both popularity and usage of on-demand transportation information systems have increased. Indeed, the proliferation of web and mobile applications has enabled requesting individuals to request transportation from one geographic location to another. For instance, an on-demand transportation information system can provide client devices with public transportation information including bus schedules, train schedules, or even location information regarding public transportation vehicles. Some on-demand transportation information systems can also display generic indicators or flat icons representing locations of public transportation vehicles within user interfaces to aid users in utilizing available public transportation.

Despite the advances of these systems, conventional on-demand transportation information systems suffer from a number of disadvantages, particularly in their accuracy, flexibility, and representations of (and estimates for) public transportation vehicles in user interfaces. For example, conventional on-demand transportation information systems often provide inaccurate location information regarding the whereabouts of public transportation vehicles. Indeed, these conventional systems often rely exclusively on public transportation information (e.g., General Transit Feed Specification or "GTFS" data), which is provided only sporadically. The conventional systems cannot therefore provide accurate, up-to-date location information for particular public transportation vehicles at, for example, times between iterations of GTFS data.

In addition to inaccurate location information, many conventional transportation information systems provide or display inaccurate representations of public transportation vehicles within graphical user interfaces. In particular, conventional systems often display generic or flat icons (e.g., dots or circles) to represent public transportation vehicles on digital maps. By using such generic or flat icons, conventional systems cannot accurately represent a public transportation vehicle along a route within a digital map. Due to the intermittent updates of public transportation vehicle locations as well as conflicting sensory readings that are out-of-sync with received GTFS data, conventional systems frequently display jarring, sudden changes to vehicle position within the graphical user interfaces. For example, conventional systems that attempt to illustrate travel directions of public transportation vehicles nonetheless depict flat vehicle icons drifting around turns while facing impossible, unnatural directions throughout an animation of the vehicle through the turn. By displaying such flat, non-representative vehicle icons, many conventional systems provide misinformation regarding locations of public transportation vehicles within graphical user interfaces.

Independent of faulty representations of vehicles within user interfaces, conventional on-demand transportation information systems rigidly update routes and locations of public transportation vehicles. Due at least in part to the periodic nature of receiving public transportation data, many conventional systems cannot provide granular location information for specific location changes in an interactive fashion. Rather, these conventional systems are limited to broad-stroke location updates that provide generic indications of public transportation vehicle locations at set time intervals.

These, along with additional problems and issues, exist with conventional on-demand transportation information systems.

SUMMARY

This disclosure describes one or more embodiments of methods, non-transitory computer-readable media, and systems that solve the foregoing problems in addition to providing other benefits. In particular, the disclosed systems can render a vehicle icon representing a public transportation vehicle to reflect predicted current locations and orientations of the public transportation vehicle traveling along a route based on current transit information. For example, the disclosed systems can receive public transit information to generate a predicted route for a public transportation vehicle, such as by generating a predicted route for a bus, a train, or a ferry. Based on the public transit information, the disclosed system can further generate predicted location points along the predicted route. By providing the predicted location points to a computing device, the disclosed systems facilitate (or trigger) the computing device to determine render orientations of the public transportation vehicle at predicted current locations along the predicted route. Based on the predicted current locations and corresponding render orientations along the predicted route, the disclosed systems can cause a computing device to accurately render a vehicle icon representing turns or other movements of the public transportation vehicle along the predicted route while pointing in a realistic-looking orientation.

BRIEF DESCRIPTION OF THE DRAWINGS

The detailed description refers to the drawings briefly described below.

DETAILED DESCRIPTION

Figure 1:
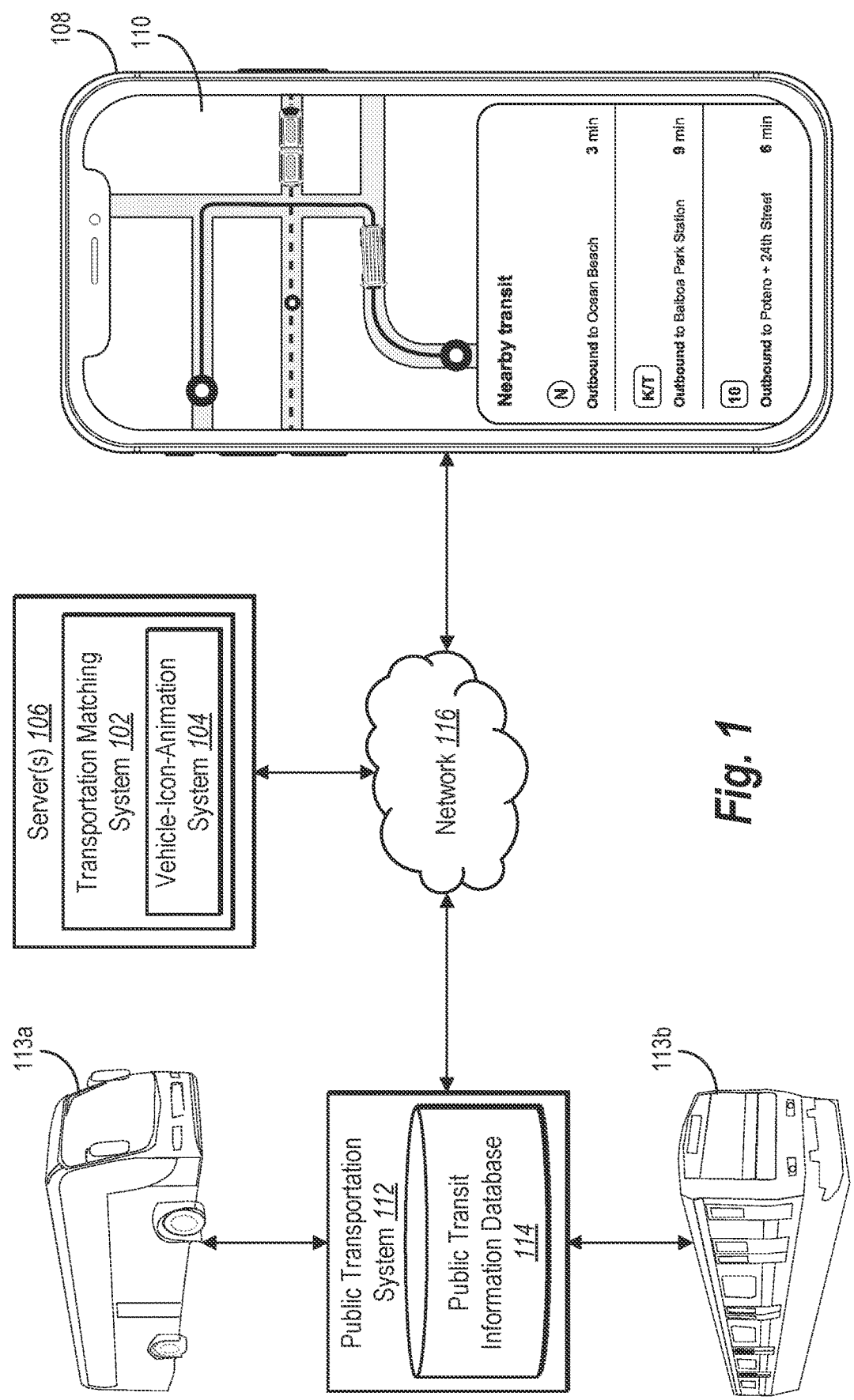
FIG. 1 illustrates a block diagram of an environment for implementing a vehicle-icon-animation system in accordance with one or more embodiments.

This disclosure describes a vehicle-icon-animation system that can render vehicle icons representing public transportation vehicles moving within a graphical map display based on predicted current locations and orientations along a predicted route. In particular, the vehicle-icon-animation system can generate a predicted route for a public transportation vehicle based on receiving transit information from a public transportation system. Such transit information may include one or both of location information and bearing information for one or more public transportation vehicles, as indicated by General Transit Feed Specification ("GTFS") data. Based on the public transit information, the vehicle-icon-animation system can generate predicted location points along the predicted route. Such points represent, for example, predicted locations of the public transportation vehicle along a route at particular times. Based on the predicted location points, the vehicle-icon-animation system can determine render orientations for a public transportation vehicle at predicted current locations along the predicted route. By providing the predicted location points to a computing device, the vehicle-icon-animation system can cause (or trigger) the computing device to render a vehicle icon corresponding to the public transportation vehicle as the icon adjusts to turns or otherwise moves through predicted current locations while pointing in render orientations along the predicted route.

As mentioned, the vehicle-icon-animation system can receive public transit information from a public transportation system. For example, the vehicle-icon-animation system can communicate with a public transportation system to receive public transit information (e.g., GTFS data) that indicates information for buses, trains, ferries, or other vehicles—such as vehicle-specific location, speed, and bearing. In some embodiments, due to the nature of public transportation systems in collecting and distributing public transit data, the vehicle-icon-animation system can receive the public transit data on an intermittent basis, sometimes with significant time gaps between updates (e.g., 15 seconds, 30 seconds, 1 minute, or longer).

As also mentioned, the vehicle-icon-animation system can generate a predicted route based on received public transit information. To elaborate, the vehicle-icon-animation system can generate a predicted route for a particular public transportation vehicle based on one or more of the location, speed, and/or bearing of the public transportation vehicle (e.g., as indicated by its GTFS data). To generate a predicted route, for instance, the vehicle-icon-animation system can compare a location and bearing of a public transportation vehicle with a repository of known public transportation vehicle routes (e.g., routes associated with public transportation vehicles of the same type). Based on such a comparison, the vehicle-icon-animation system can identify a route that corresponds to the location and bearing of the public transportation vehicle.

In addition to generating a predicted route for a public transportation vehicle, the vehicle-icon-animation system can also generate predicted location points for the public transportation vehicle along the predicted route. More specifically, the vehicle-icon-animation system can generate predicted location points that indicate locations along a predicted route where a public transportation vehicle is predicted to be located at particular times while traveling along the route. In some embodiments, the vehicle-icon-animation system can generate the predicted location points having a defined (e.g., even) spacing along the predicted route where, for example, the predicted location points are spread at intervals of time (e.g., 1 second apart, 2 seconds apart) or distance (e.g., 5 meters apart, 10 meters apart, 20 meters apart).

As mentioned above, the vehicle-icon-animation system can provide one or both of the predicted route and the predicted location points to a client device. In particular, the vehicle-icon-animation system can provide the predicted route and the predicted location points to the client device to cause the client device to perform certain actions. In some embodiments, the vehicle-icon-animation system is located remotely from the client device. In other embodiments the vehicle-icon-animation system is located (entirely or in part) on the client device. In any event, the vehicle-icon-animation system can cause the client device to generate a render orientation for a public transportation vehicle at a location along the predicted route—based on the system providing the predicted route and/or the predicted location points. Indeed, the vehicle-icon-animation system (or the client device) can determine render orientations for the public transportation vehicle to indicate directions in which the public transportation vehicle is pointing or facing at various locations along the predicted route such as a predicted current location or a predicted subsequent location.

Based on the render orientations for the public transportation vehicle for the various locations along the predicted route, the vehicle-icon-animation system can perform (or cause the client device to perform) additional actions such as rendering a vehicle icon pointing in a render orientation at a particular location, such as a predicted current location. To elaborate, the vehicle-icon-animation system (or the client device) can present a graphical map display that includes a vehicle icon representing a public transportation vehicle. Within the graphical map display, the vehicle-icon-animation system (or the client device) can render the vehicle icon moving along the predicted route at a predicted current location (or in a series of such locations) while pointing in the render orientation.

As suggested above, the vehicle-icon-animation system (or the client device) can render a vehicle icon at or between predicted locations along a predicted route while pointing in corresponding render orientations. Over time, the vehicle-icon-animation system (or the client device) can render the vehicle icon pointing in different orientations at different location points in sequential fashion to generate an animation for realistic-looking movement and orientation of the vehicle icon. Such a series of renderings over time can represent or roughly estimate actual movement and orientation of the corresponding public transportation vehicle along a route. The vehicle-icon-animation system can accordingly render a vehicle icon at different predicted current locations moving through a turn or other movements while pointing in render orientations resembling a public transportation vehicle's real orientations through real turns or other movements.

For example, the vehicle-icon-animation system can determine render orientations based on predicted location points. To elaborate, the vehicle-icon-animation system can generate intersecting lines between predicted location points along a predicted route and can render a vehicle icon to point in render orientations along the intersecting lines. More specifically, the vehicle-icon-animation system can determine a predicted location point that the public transportation vehicle has most recently passed while traveling along a predicted route and can generate an intersecting line from the most recently predicted location point to a subsequent predicted location point along the predicted route. In some embodiments, the vehicle-icon-animation system generates intersecting lines between most recently predicted location points and corresponding predicted location points that are the farthest away (within a threshold distance) from the predicted current location of the public transportation vehicle or the most recently predicted location point.

In addition to rendering a vehicle icon based on initial public transit information, the vehicle-icon-animation system can update (or cause the client device to update) the graphical map display based on updated public transit information. More specifically, the vehicle-icon-animation system can request and receive updated transit information from a public transportation system. Based on receiving the updated public transit information, the vehicle-icon-animation system can determine whether to generate an updated predicted route and/or updated predicted location points based on a threshold distance from a predicted location.

For example, the vehicle-icon-animation system can compare a predicted location for the public transportation vehicle (e.g., at a particular predicted location point along the predicted route) with an actual location of the public transportation vehicle (e.g., as indicated by the updated public transit information). Based on determining that the actual location of the public transportation vehicle is within a threshold distance from the predicted location, the vehicle-icon-animation system can refrain from generating an updated predicted route and/or updated predicted location points. Based on determining that the actual location of the public transportation vehicle is outside the threshold distance from the predicted location, on the other hand, the vehicle-icon-animation system can generate an updated predicted route and updated predicted location points. The vehicle-icon-animation system (or the client device) can further render the vehicle icon pointing in an updated orientation at an updated predicted location point.

As suggested above, the vehicle-icon-animation system provides several advantages and benefits over conventional on-demand transportation information systems. For instance, the vehicle-icon-animation system improves the accuracy with which transportation information systems communicate or display locations of public transportation vehicles by generating predicted routes and predicted location points for such vehicles. More specifically, the vehicle-icon-animation system can utilize public transit information (e.g., GTFS data) to generate predicted location points for a public transportation vehicle between updates of the public transit information. Unlike the sporadic and inconsistent updates from conventional systems based exclusively on public transit information, the vehicle-icon-animation system can determine locations of public transportation vehicles at a much more granular scale.

In addition, the vehicle-icon-animation system improves conventional user interfaces by providing or displaying more accurate representations of public transportation vehicles within a graphical user interface than conventional systems. Conventional transportation information systems often display generic or flat icons such as dots or circles to represent public transportation vehicles and cannot accurately represent changes in orientation of public transportation vehicles. For example, such conventional systems often point flat icons in the wrong or unrealistic orientations while depicting a vehicle navigating through a turn in a graphical user interface.

By contrast, the vehicle-icon-animation system renders a vehicle icon that can indicate realistic-looking orientations of the public transportation vehicle in a graphical user interface. By estimating orientations from predicted location points, the vehicle-icon-animation system can determine accurate orientations for a public transportation vehicle navigating along a predicted route. In some cases, the vehicle-icon-animation system such realistic-looking orientations by rendering a vehicle icon to point in an orientation along an intersecting line between an initial predicted location point and a subsequent predicted location point within a threshold distance of the initial point. Rather than displaying drifting around turns (e.g., where icons face impossible or unnatural directions) or other jarring movements—as conventional transportation information systems do—the vehicle-icon-animation system can determine and display accurate orientations of the public transportation vehicle within a graphical map display.

Further, the vehicle-icon-animation system improves the flexibility with which transportation information systems update routes and locations of public transportation vehicles along or without such routes. In contrast to conventional systems that are limited to broad-stroke, generalized location and/or orientation updates, the vehicle-icon-animation system can generate more granular location and orientation updates. Indeed, the vehicle-icon-animation system can flexibly determine orientations on a specific, detailed basis for individual predicted location points. Based on such determined predicted location points, the vehicle-icon-animation system can render more precise looking locations and orientations of a public transportation vehicle as it travels along a route or departs from the route along a detour.

As indicated by the foregoing discussion, the present disclosure utilizes a variety of terms to describe features and advantages of the vehicle-icon-animation system. For example, as used herein, the term "public transit information" refers to information or data that indicates location, route, schedule, status, or movements of one or more public transportation vehicles. For example, public transit information can include speed, location, and/or bearing of a public transportation vehicle. In some embodiments, public transit information can also (or alternatively) include an indication of a current route (e.g., a route identification) and/or one or more scheduled future routes. Public transit information can include GTFS data. Such GTFS data can include a number of fields indicating various data pertaining to public transportation vehicles. For example, public transit information can include vehicle-specific agency information (e.g., agency name, agency time zone), route information (e.g., route identification, route type), and/or stop information (e.g., stop identification and/or stop times for stops along a route).

Relatedly, the term "public transportation vehicle" refers to a transportation vehicle that transports (or has the capacity to transport) passengers in association with a public transportation system or with a publicly available system of transport. For example, a public transportation vehicle can include, but is not limited to, an airplane, a bus, a ferry, or a train. In some embodiments, a public transportation vehicle can include a different type of vehicle such as a tram, trolley, or some other public transportation vehicle. In some embodiments, a public transportation vehicle can include an autonomous vehicle where all or part of the navigation and/or driving functionality of the public transportation vehicle is performed by a computer system.

As mentioned, the vehicle-icon-animation system can generate a predicted route based on public transit information. As used herein, the term "predicted route" refers to a travel route anticipated or estimated for (or associated with) a public transportation vehicle (e.g., along one or more road segments, track segments, or waterway segments). For example, a predicted route can include a path with one or more stops for pickup and/or drop-off of goods or passengers. A predicted route can also include a route that the vehicle-icon-animation system predicts for a given public transportation vehicle based on public transit information pertaining to the given public transportation vehicle. In some embodiments, a predicted route refers to a collection or sequence of predicted location points for a public transportation vehicle, where the points are connected together to form a route polyline (e.g., a travel path made up of multiple line segments connecting predicted location points).

As also mentioned, the vehicle-icon-animation system can generate predicted location points along a predicted route for a public transportation vehicle. As used herein, the term "predicted location point" refers to a location along a route that corresponds to an anticipated location for a public transportation vehicle. For example, a predicted location point can include a location along a predicted route that the vehicle-icon-animation system predicts a public transportation vehicle will be located at a particular time or during travel along the predicted route. In some embodiments, a predicted location point includes a geographical coordinate location (e.g., a latitude, a longitude, and/or an elevation). In these or other embodiments, predicted location points can be spaced apart along a route at particular intervals (e.g., even or uneven intervals). For example, predicted location points can be spaced at travel-time intervals (e.g., ½ second, 1 second, 2 seconds, etc.) to indicate predicted locations of a public transportation vehicle traveling along a route at the given intervals (depending on variations in travel speed, the time-spaced predicted location points may be unevenly spaced within a graphical map). As another example, the predicted location points can be spaced at distance intervals (e.g., 5 meters, 10 meters, 20 meters, etc.). In some embodiments the vehicle-icon-animation system can determine a "most recent predicted location point" that includes a predicted location that the public transportation vehicle has most recently passed (or is predicted to have most recently passed) while traveling along a predicted route.

Based on the predicted location points, the vehicle-icon-animation system can generate (or cause a client device to generate) render orientations for a public transportation vehicle. As used herein, the term "render orientation" refers to a direction or orientation that a vehicle icon is rendered to indicate an orientation of a public transportation vehicle. Such a render orientation may represent or resemble a corresponding orientation that a public transportation vehicle is determined or predicted to be facing or pointing at a particular location or at a particular time. For example, a render orientation can include an orientation that the vehicle-icon-animation system generates based on predicted location points. Indeed, a render orientation can resemble or indicate a direction that a public transportation vehicle is (or could be) facing at a predicted current location or at a predicted subsequent location.

Additionally, the vehicle-icon-animation system can render (or cause a client device to render) a vehicle icon to point in a render orientation at a predicted location point. As used herein, the term "vehicle icon" refers to a marker or icon that represents a public transportation vehicle within a graphical map display. In particular, a vehicle icon can include a vehicle-specific shape or form factor, such as an airplane icon that looks like an airplane, a bus icon that looks like a bus, a train icon that looks like a train, or a ferry icon that looks like a ferry. Other shapes or appearances of a vehicle icon are also possible, depending on the type of public transportation vehicle (e.g., tram, trolley, etc.). In some cases, a vehicle icon is based on a three-dimensional model of a public transportation vehicle or three-dimensional model of a cartoon representing the public transportation vehicle. While such a vehicle icon can be based on a three-dimensional icon, the vehicle-icon-animation system can display (or cause to display) the vehicle icon within a two-dimensional graphical map display.

Turning now to FIG. 1, which provides an overview of the vehicle-icon-animation system. As shown, FIG. 1 includes a block diagram of an environment for implementing a vehicle-icon-animation system 104 in accordance with one or more embodiments. As shown in FIG. 1, the environment includes the server(s) 106 housing the vehicle-icon-animation system 104 as part of a transportation matching system 102. The environment of FIG. 1 further includes a client device 108, a public transportation system 112, public transportation vehicles 113*a* and 113*b*, and a network 116. The server(s) 106 can include one or more computing devices to implement the vehicle-icon-animation system 104. While FIG. 1 depicts the client device 108 as a mobile device, the client device 108 may be or comprise any computing device as described in FIGS. 12-13. Additional description regarding the illustrated computing devices (e.g., the server(s) 106 and/or the client device 108) is provided with respect to FIGS. 12-13 below.

As shown, the vehicle-icon-animation system 104 utilizes the network 116 to communicate with the client device 108 and the public transportation system 112. For example, the vehicle-icon-animation system 104 communicates with the client device 108 and the public transportation system 112 via the network 116 to match transportation requests with transportation vehicles or public transportation vehicles, track and communicate a status of public transportation vehicles, and/or to render vehicle icons having render orientations at particular predicted location points within a graphical map display. In some embodiments, per device settings, the vehicle-icon-animation system 104 receives device information from the client device 108 such as location coordinates (e.g., latitude and longitude) and status (currently riding, not riding, available, or unavailable) for matching requests.

To facilitate tracking public transportation vehicles and connecting requests with transportation vehicles or public transportation vehicles, the vehicle-icon-animation system 104 further communicates with the client device 108 (e.g., through a client application 110). As indicated by FIG. 1, the client device 108 includes a client application 110. In many embodiments, the vehicle-icon-animation system 104 communicates with the client device 108 through the client application 110 to, for example, receive and provide information including request information and public transportation vehicle information. Additionally, the client application 110 optionally includes computer-executable instructions that, when executed by the client device 108, cause the client device 108 to perform certain functions.

For instance, the client application 110 can include computer-executable instructions that (upon execution) cause the client device 108 to communicate with the vehicle-icon-animation system 104 to display various public transportation vehicle information via a graphical map display. Indeed, the vehicle-icon-animation system 104 can communicate with the client device 108 to cause the client device 108 to present a graphical user interface for the client application 110 that includes certain elements, such as a digital map for one or more public transportation vehicles traveling along transit routes on roads, rails, or waterways. Based on instructions of the client application 110, in some cases, the vehicle-icon-animation system 104 can cause the client device 108 to display a graphical map and to render vehicle icons within the graphical map display to represent the public transportation vehicles 113a or 113b at particular locations and facing in render orientations.

As shown in FIG. 1, the environment also includes a public transportation system 112 in communication with the vehicle-icon-animation system 104 (e.g., to provide public transit information). For example, the public transportation system can manage public transportation vehicles of one or more types to arrange routes and schedules, such as routes and schedules for the public transportation vehicles 113a and 113b. In addition, the public transportation system 112 can collect or gather location, speed, and bearing information from the public transportation vehicles 113a and 113b. Thus, the public transportation system 112 can generate and organize public transit information (e.g., GTFS data) to provide to the vehicle-icon-animation system 104. Indeed, the public transportation system 112 can include a public transit information database 114 that the public transportation system 112 utilizes to store public transit information. In some embodiments, the vehicle-icon-animation system 104 communicates with the public transportation system 112 (or the public transit information database 114) via the network 116 to access or receive public transit information concerning the public transportation vehicles 113a and 113b.

As indicated above, the vehicle-icon-animation system 104 can render (or cause the client device 108 to render) a vehicle icon representing a public transportation vehicle to reflect predicted current locations and orientations of the public transportation vehicle traveling along a route. For example, in some cases, the client device 108 receives from the transportation matching system 102 predicted location points for the public transportation vehicle 113a traveling along a predicted route. Based on the predicted location points, the client device 108 generates a render orientation for the public transportation vehicle 113a at a predicted current location along the predicted route. As shown in FIG. 1, the client device 108 further renders within a graphical map display a vehicle icon representing the public transportation vehicle 113a traveling along the predicted route and pointing in the render orientation at the predicted current location. FIG. 1 illustrates an example of one such graphical map display based on instructions from the client application 110 within the client device 108.

Although FIG. 1 illustrates the environment having a particular number and arrangement of components associated with the vehicle-icon-animation system 104, in some embodiments, the environment may include more or fewer components with varying configurations. For example, in some embodiments, vehicle-icon-animation system 104 can communicate directly with the client device 108, bypassing the network 116. In these or other embodiments, the vehicle-icon-animation system 104 can be housed (entirely on in part) on the client device 108. Additionally, the public transportation system 112 can be located within (e.g., as part of the transportation matching system 102) or externally from the server(s) 106.

Figure 2:
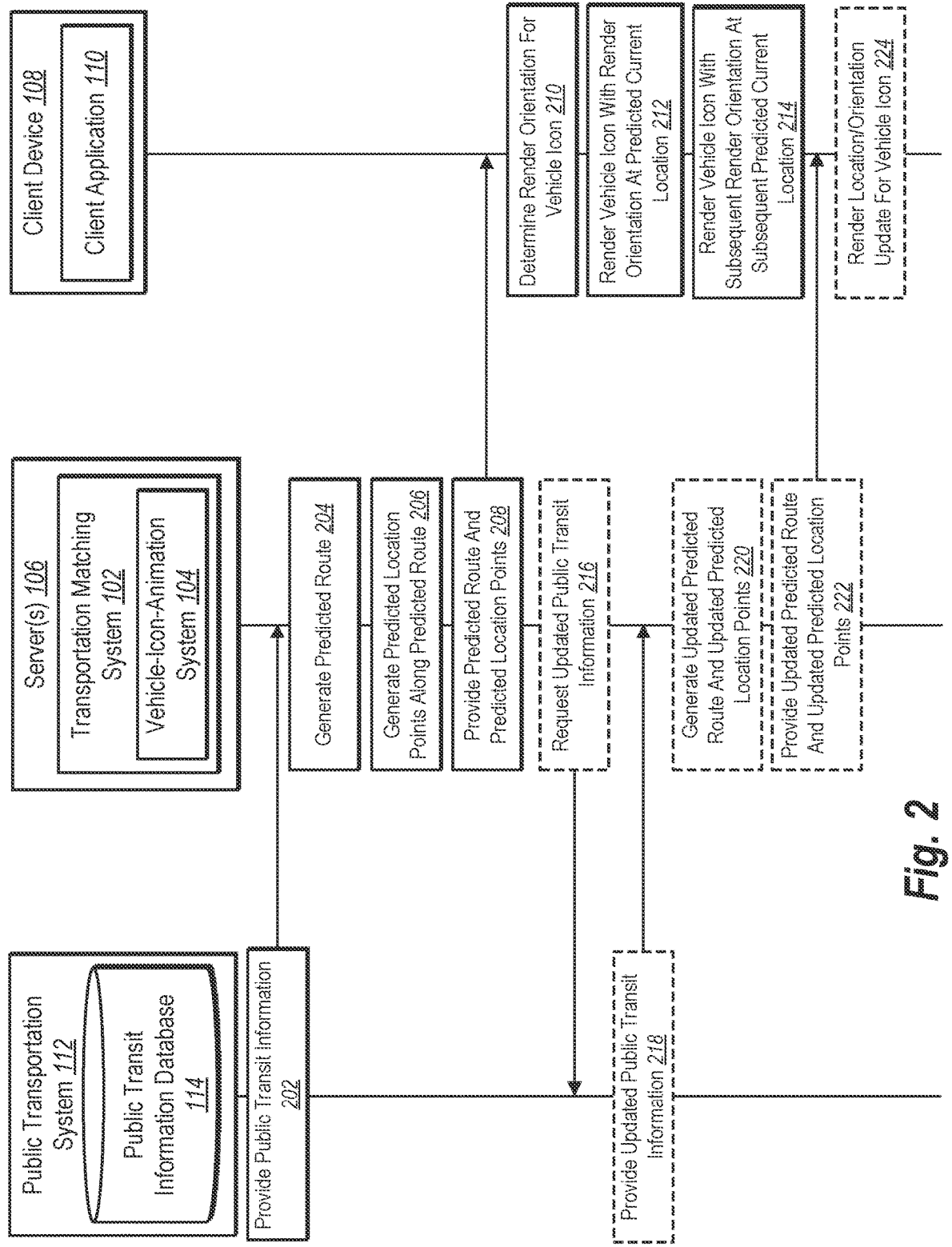
FIG. 2 illustrates an example sequence of acts associated with the vehicle-icon-animation system in accordance with one or more embodiments.

As mentioned, the vehicle-icon-animation system 104 can render (or cause a client device to render) a vehicle icon pointing in a render orientation at a predicted location point along a predicted route. As a basis for (or precursor to) determining a render orientation at a predicted location point, the vehicle-icon-animation system 104 can receive public transit information and can generate a predicted route and predicted location points along the predicted route based on the public transit information. FIG. 2 illustrates an example sequence flow for rendering a vehicle icon within a graphical map display based on public transit information. As indicated by FIG. 2, the sequence flow includes acts 202-224 performed by one or more of the public transportation system 112, the server(s) 106, and/or the client device 108 in accordance with one or more embodiments.

In some embodiments, the public transportation system 112, the server(s) 106, or the client 108 include computer-executable instructions that, when executed by a processor thereon, cause the public transportation system 112, the server(s) 106, or the client 108 to perform one of the acts 202-224. While the transportation matching system 102 or the vehicle-icon-animation system 104 may each comprise instructions that (upon execution) cause the server(s) 106 to perform certain actions, this disclosure describes the transportation matching system 102 or the vehicle-icon-animation system 104 as performing such actions below for brevity.

As shown in FIG. 2, the public transportation system 112 performs an act 202 to provide public transit information to the vehicle-icon-animation system 104. For example, the public transportation system 112 provides GTFS data including location, speed, and/or bearing information pertaining to one or more public transportation vehicles. In some embodiments, the vehicle-icon-animation system 104 requests the public transit information to cause the public transportation system 112 to perform the act 202. In addition, the vehicle-icon-animation system 104 receives the public transit information from the public transportation system 112.

Based on receiving the public transit information from the public transportation system 112, the vehicle-icon-animation system 104 performs an act 204 to generate a predicted route. In some cases, the vehicle-icon-animation system 104 generates a predicted route for a public transportation vehicle based on one or more portions of the public transit information. Indeed, in some embodiments, the vehicle-icon-animation system 104 generates or determines a predicted route based on a location and a bearing of a public transportation vehicle, disregarding other public transit information (e.g., speed or other data). In other embodiments, the vehicle-icon-animation system 104 generates a predicted route based on additional portions of the public transit information such as location, bearing, and speed.

Additionally, or alternatively, in one or more embodiments, the vehicle-icon-animation system 104 generates a predicted route based on historical public transit information. To elaborate, in some cases, the vehicle-icon-animation system 104 receives public transit information from various public transportation vehicles over a period of time. The vehicle-icon-animation system 104 further compiles a collection of public transit information associated with different public transportation vehicles to determine routes traveled by the public transportation vehicles. Because the public transit information received from the public transportation system 112 can often be clustered in particular locations (e.g., due to the intermittent collection and distribution of the public transit information by the public transportation system 112), the vehicle-icon-animation system 104 performs a process to extrapolate predicted routes from the public transit information.

For instance, the vehicle-icon-animation system 104 links an indicated location for a public transportation vehicle at a particular time (as given by a time stamp of the public transit information) with a subsequent indicated location for the public transportation vehicle via a straight-line segment. In some embodiments, the vehicle-icon-animation system 104 determines a composite or average location within a cluster of historical locations (associated with multiple public transportation vehicles) as an indicated location. By linking multiple such line segments together between indicated locations for public transportation vehicles, the vehicle-icon-animation system 104 generates a repository of routes for the public transportation vehicles in the form of route polylines.

Given various public transit information such as location and bearing, the vehicle-icon-animation system 104 can determine a predicted route for a public transportation vehicle by matching the location and bearing to historical public transit information indicating a previous location and bearing within a certain tolerance or threshold. For example, the vehicle-icon-animation system 104 determines a location and bearing of a public transportation vehicle from received public transit information. The vehicle-icon-animation system 104 compares the location and bearing with historical locations and bearings of public transportation vehicles. The vehicle-icon-animation system 104 therefore identifies a historical location and bearing that is a closest match (or that satisfies a threshold similarity) to the current location and bearing (e.g., by comparing weighted combinations of location and bearing). In some embodiments, the vehicle-icon-animation system 104 considers other public transit information (and corresponding historical public transit information) such as speed and/or route identification when identifying or generating a predicted route for a public transportation vehicle.

As further illustrated in FIG. 2, the vehicle-icon-animation system 104 performs an act 206 to generate predicted location points for a public transportation vehicle along a predicted route. In particular, the vehicle-icon-animation system 104 determines locations along the predicted route where the public transportation vehicle is expected or anticipated to be located at particular times. In some embodiments, the vehicle-icon-animation system 104 generates predicted location points as predictions of where a public transportation vehicle will be located every second (or a half second or two seconds) while traveling along a predicted route.

To generate predicted location points, the vehicle-icon-animation system 104 generates geometric projections based on public transit information. To elaborate, the vehicle-icon-animation system 104 projects indicated locations onto a predicted route (e.g., a route polyline) based on received public transit information indicating a location and a bearing (and a current speed in some embodiments) of a public transportation vehicle. For example, based on the indicated bearing and the indicated location of a public transportation vehicle, the vehicle-icon-animation system 104 projects a location point onto a predicted route where the public transportation vehicle will be located at a particular time such as, for instance, one second (or a half second or two seconds) from the current time. In some embodiments, the vehicle-icon-animation system 104 ignores or disregards public transit information indicating a speed of a public transportation vehicle because many public transportation vehicles have frequent stops, speed changes in traffic, and other factors that limit the reliability of speed in making predictions via generating geometric projections.

In some embodiments, the vehicle-icon-animation system 104 generates predicted location points based on historical public transit information. Particularly, the vehicle-icon-animation system 104 accesses historical public transit information (e.g., from the public transit information database 114) indicating locations of previous public transportation vehicles along the predicted route. The vehicle-icon-animation system 104 utilizes one or more of the previous locations as location points for the public transportation vehicle. For example, the vehicle-icon-animation system 104 determines an average historical location from among a set of historical location points within a threshold distance of each other to utilize as a predicted location point. In some embodiments, the vehicle-icon-animation system 104 utilizes other (e.g., additional) portions of historical public transit information such as previous speeds and/or previous bearings for previous public transportation vehicles that traveled along the predicted route. Based on historical locations and historical bearings, for example, the vehicle-icon-animation system 104 generates a geometric projection of a location along the predicted route to utilize as a predicted location point.

In one or more embodiments, the vehicle-icon-animation system 104 receives indications of locations for a public transportation vehicle (e.g., from current public transit information and/or historical public transit information) that are not directly on a predicted route (e.g., a route polyline). In some such embodiments, the vehicle-icon-animation system 104 generates a geometric projection from the location to the predicted route to utilize the projected location point on the predicted route as the predicted location point. As a result of utilizing such geometric projections, the vehicle-icon-animation system 104 reduces jitter that might otherwise be caused by animating across such offset locations. Thus, the vehicle-icon-animation system 104 smoothly renders (or causes the client device 108 to render) a vehicle icon at different predicted location points along a representation of the predicted route within a graphical map display.

In some embodiments, the vehicle-icon-animation system 104 generates predicted location points along the predicted route based on additional (or alternative) information such as mobile device data associated with anonymous passengers of public transportation vehicles. To elaborate, in some cases, the vehicle-icon-animation system 104 analyzes historical and/or current information for mobile devices associated with anonymous users of the transportation matching system 102 to determine predicted location points along a predicted route. In accordance with device settings and privacy considerations, the vehicle-icon-animation system 104 analyzes orientations, locations, and/or speeds of mobile devices traveling (or that previously traveled) a given predicted route to indicate where the vehicle-icon-animation system 104 can expect a current public transportation vehicle to be located and oriented along the predicted route at various times. In one or more embodiments, the vehicle-icon-animation system 104 determines one or both of a location and an orientation of a public transit vehicle based on data from mobile user devices, as described by Kristina Gibson et al., Dynamically Forecasting and Dispatching Transportation Vehicles to Travelers on Mass-Transit Vehicles, U.S. application Ser. No. 15/859,264 (filed Dec. 29, 2017), the entire contents of which are hereby incorporated by reference.

As illustrated in FIG. 2, the vehicle-icon-animation system 104 further performs an act 208 to provide the predicted route and the predicted location points to the client device 108. More specifically, the vehicle-icon-animation system 104 provides the predicted route and the predicted location points that the public transportation vehicle is predicted to follow to the client device 108 to thereby cause the client device 108 to perform particular functions. For example, the vehicle-icon-animation system 104 provides the predicted route and the predicted location points to the client device 108 to cause or trigger the client device 108 to perform the acts 210 and 212. In some embodiments, the vehicle-icon-animation system 104 provides only the predicted location points to cause the client device 108 to perform the acts 210 and 212. In one or more embodiments, the client device 108 performs the acts 210 and 212 via the client application 110. In other embodiments, however, the vehicle-icon-animation system 104 is located (entirely or in part) on the client device 108, and the vehicle-icon-animation system 104 thus performs the acts 210 and 212 (and the act 224 described thereafter).

As shown, based on receiving the predicted route and/or the predicted location points, the client device 108 (or the vehicle-icon-animation system 104) performs the act 210 to determine a render orientation for a vehicle icon. In particular, the client device 108 determines a render orientation of the public transportation vehicle at a predicted current location along the predicted route to utilize (as an orientation) for rendering a corresponding vehicle icon within a graphical map display. In some embodiments, the client device 108 determines render orientations for multiple predicted locations (on or between location points) along the predicted route. Indeed, the client device 108 determines an orientation in which the public transportation vehicle is expected to be pointing at a given location (e.g., a current location or a subsequent location) while traveling along the predicted route.

For example, the client device 108 (or the vehicle-icon-animation system 104) generates render orientations along intersecting lines between predicted location points. In some embodiments, the client device 108 (or the vehicle-icon-animation system 104) generates an intersecting line from (i) a predicted location point along a predicted route that the vehicle-icon-animation system predicts the public transportation vehicle has most recently passed and (ii) a subsequent predicted location point within a threshold distance. In other embodiments, the client device 108 generates an intersecting line between a most recently predicted location point and an immediately subsequent predicted location point. Additional detail regarding how the client device 108 (or the vehicle-icon-animation system 104) generates a render orientation at a given predicted location point is provided below with reference to FIG. 6.

Based on determining render orientations at respective predicted locations, the client device (or the vehicle-icon-animation system 104) further performs an act 212 to render a vehicle icon with a render orientation at a predicted location. In particular, the client device 108 renders a vehicle icon within a graphical map display to represent the public transportation vehicle traveling along the predicted route. At a given predicted location, the client device 108 also renders the vehicle icon pointing in a render orientation to accurately and realistically resemble or represent the direction that the public transportation vehicle is (or could be) facing at that location.

As further shown in FIG. 2, the client device 108 performs an act 214 to render the vehicle icon with a subsequent render orientation at a subsequent predicted current location. More particularly, the vehicle-icon-animation system 104 generates a predicted current location for the public transportation vehicle subsequent to the previous current predicted location. Based on the subsequent predicted current location, the client device 108 (or the vehicle-icon-animation system 104) also determines a render orientation at the subsequent predicted current location. In addition, the client device 108 (or the vehicle-icon-animation system 104) renders the vehicle icon pointing in the subsequent render orientation at the subsequent predicted current location.

For example, as a public transportation vehicle travels around a curve in a predicted route, the client device 108 renders the vehicle icon within the graphical map display pointing in corresponding render orientations at various predicted locations in accordance with the anticipated travel of the public transportation vehicle around the curve. By rendering the vehicle icon at various predicted locations, the client device 108 thereby presents an animation (e.g., a sequence of renderings) of the vehicle icon traveling around the curve. Such renderings of the vehicle icon at locations within the graphical map are contemporaneous with predicted locations of the public transportation vehicle.

As further illustrated in FIG. 2, the vehicle-icon-animation system 104 performs an act 216 to request updated public transit information from the public transportation system 112. Based on the request, the public transportation system 112 performs an act 218 to provide updated public transit information to the vehicle-icon-animation system 104. Indeed, the vehicle-icon-animation system 104 can request and receive updated public transit information on a periodic basis (e.g., in accordance with GTFS updates of the public transportation system 112). In addition, the vehicle-icon-animation system 104 compares the updated public transit information with predicted location points and/or render orientations associated with a public transportation vehicle. In some embodiments, the public transportation system 112 provides the public transit information without requiring a request from the vehicle-icon-animation system 104. Indeed, the public transportation system 112 can provide public transit information (e.g., as act 202) and/or updated public transit information (e.g., as act 218) proactively (as a "push") upon collecting the public transit information for one or more public transportation vehicles.

To compare updated public transit information with predicted information (e.g., location and orientation) of the public transportation vehicle, the vehicle-icon-animation system 104 compares an indicated location and/or an indicated bearing (e.g., as received via updated public transit information) with a predicted current location and/or a predicted current orientation for the public transportation vehicle. Indeed, by comparing current public transit information with predicted locations/orientations, the vehicleicon-animation system 104 determines whether or not public transit information is within a distance threshold. For example, the vehicle-icon-animation system 104 determines whether the most recently indicated location of the public transportation vehicle (e.g., as indicated by updated public transit information) is within or outside a threshold distance (e.g., 10 meters, 20 meters, 50 meters, or 100 meters) of a predicted current location of the public transportation vehicle.

Based on determining that the indicated location of the public transportation vehicle is within the threshold distance of the predicted current location, the vehicle-icon-animation system 104 determines that no update to the location of the vehicle icon is necessary. Thus, when the indicated location is within the threshold distance, the vehicle-icon-animation system 104 refrains from generating an updated predicted route and/or updated predicted location points. As a result of refraining from generating and providing an updated predicted route and/or updated predicted location points, the vehicle-icon-animation system 104 further refrains from modifying (or causing the client device 108 to modify) the rendering of the vehicle icon along a predicted route. Put another way, by refraining from updating the predicted route and/or the predicted location points, the vehicle-icon-animation system 104 continues (or causes the client device 108 to continue) to render the vehicle icon within the graphical map display as initially predicted, as opposed to updating the location of the vehicle icon in response to public transit information outside the threshold distance.

Based on determining that the indicated location of the public transportation vehicle is outside the threshold distance, on the other hand, the vehicle-icon-animation system 104 determines that additional action is needed to update the location of the vehicle and further performs an act 220 to generate an updated predicted route and updated predicted location points. In particular, the vehicle-icon-animation system 104 determines that the indicated location of the public transportation vehicle is too far away from its predicted location to continue rendering the vehicle icon along the predicted route as initially predicted and that, therefore, an update is needed to more accurately represent the location of the public transportation vehicle.

For example, in some cases, a public transportation vehicle may take a detour or other unexpected route that results in the indicated location of the public transportation vehicle being outside the threshold distance. As another example, the public transportation vehicle may get stuck in unexpected traffic or be slowed down for some other reason (e.g., construction, a passing ambulance or fire engine, or technical difficulties) which results in the indicated location of the public transportation vehicle being outside the threshold distance from its predicted location.

In any event, the vehicle-icon-animation system 104 generates an updated predicted route and/or updated predicted location points for the public transportation vehicle in accordance with the above description regarding acts 204 and 206 for generating a predicted route and predicted location points along the predicted route. As further shown in FIG. 2, the vehicle-icon-animation system 104 performs an act 222 to provide the updated predicted route and/or the updated predicted location points to the client device 108. By providing the updated predicted route and/or the updated predicted location points to the client device 108, the vehicle-icon-animation system 104 causes, prompts, or triggers the client device 108 to perform the act 224. In some embodiments, as mentioned, the vehicle-icon-animation system 104 performs the act 224 as part of the client device 108.

As shown in FIG. 2, the client device 108 (or the vehicle-icon-animation system 104) performs an act 224 to render a location and/or orientation update for a vehicle icon within a graphical map display. Indeed, the client device 108 renders an update to the predicted location and the render orientation of the vehicle icon based on the determination that the updated public transit information indicates the public transportation vehicle is outside the threshold distance from its predicted location.

To render the update, the client device 108 (or the vehicle-icon-animation system 104) performs one or more transitional processes to render movement of the vehicle icon within the graphical map display from the initial (i.e., pre-updated) predicted location point to the updated predicted location point. In some implementations, the client device 108 renders the vehicle icon at different positions along road segments (or rail segments or waterway segments) connecting the predicted current location to an indicated location of the public transportation vehicle (as indicated by the updated public transit information). By doing so, the client device 108 renders the vehicle icon at different locations along various roads (or rails or waterways) to more seamlessly animate the transition from the predicted location to the indicated location of the public transportation vehicle. Indeed, the vehicle-icon-animation system 104 may determine connecting road segments (or rail segments or waterway segments) based on analyzing map information, route information, or historical public transit information indicating previous travel routes of public transportation vehicles.

In other implementations, the client device 108 (or the vehicle-icon-animation system 104) renders a transition animation to update the location of the vehicle icon within the graphical map display. More particularly, the client device 108 renders a transition animation by removing the vehicle icon from the predicted current location and rendering the vehicle icon at the indicated location within the graphical map display. In some embodiments, the client device 108 renders an arrow or other indicator to illustrate the change in location of the vehicle icon within the graphical map. In these or other embodiments, the client device 108 renders a sliding animation or a translation animation of the map or the vehicle icon within the graphical map display to show the change in location of the vehicle icon (e.g., to center the vehicle icon within the display). In one or more embodiments, the client device 108 renders the transition animation to appear as though the vehicle icon "snaps" to the current location.

Additionally, based on the updated public transit information, the client device 108 (or the vehicle-icon-animation system 104) determines an updated render orientation at the updated predicted current location. The client device 108 further renders the vehicle icon pointing in the updated render orientation at the updated predicted current location along the updated predicted route. Thus, the client device 108 displays the vehicle icon within a graphical map display at the updated location and facing the render orientation based on the updated public transit information.

As mentioned, the vehicle-icon-animation system 104 can present (or cause the client device 108 to present) a graphical map display including vehicle icons representing public transportation vehicles traveling along public transportation routes. FIGS. 3, 4B, and 7A-9B illustrate example embodiments of graphical user interfaces comprising a graphical map display for the client device 108. As an overview, FIGS. 3, 4B, and 7A-9B each depict the client device 108 comprising the client application 110 for the transportation matching system 102. In some embodiments, the client application 110 comprises computer-executable instructions that cause the client device 108 to perform certain actions depicted in FIGS. 3, 4B, and 7A-9B.

Figure 3:
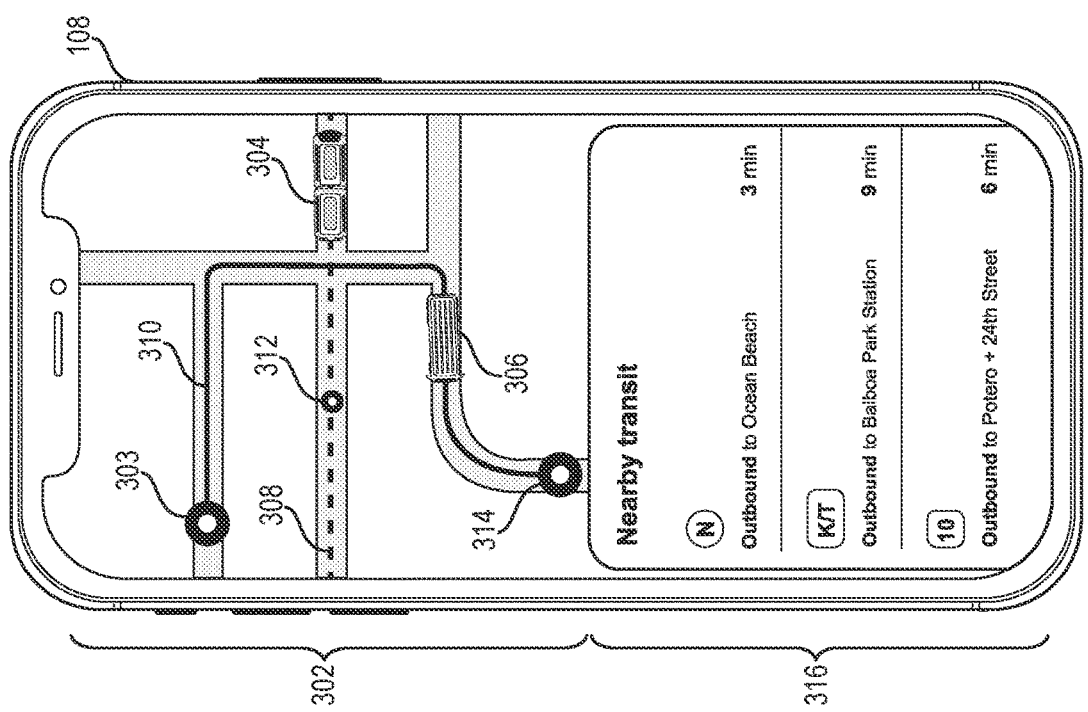
FIG. 3 illustrates an example client device displaying a graphical map display of public transportation vehicles in accordance with one or more embodiments.

For example, FIG. 3 illustrates an example of the client device 108 presenting a graphical map display 302 including vehicle icons 304 and 306 in accordance with one or more embodiments. As shown in FIG. 3, the client device 108 presents the graphical map display 302 along with an information display 316. Within the information display 316, the client device 108 presents route-specific or public-transportation-vehicle-specific information to indicate nearby transit available to a user (e.g., a requester) of the client device 108. Such information can include route identifications, public transportation types, public transportation vehicle destinations/stops, and/or an estimated time of arrival.

Within the graphical map display 302, the client device 108 presents the vehicle icon 304 representing a train traveling along a predicted route 308 (including a stop 312). The client device 108 also presents the vehicle icon 306 representing a bus traveling along the route 310 from the stop 303 to the stop 314. As shown, the client device 108 renders the vehicle icons 304 and 306 to have representative likenesses for different types of public transportation vehicles. In addition, the client device 108 renders the predicted routes 308 and 310 to have different appearances (e.g., where the route 308 is represented by a dashed line) to differentiate between predicted routes associated with different types of public transportation vehicles.

As mentioned above, the vehicle-icon-animation system 104 improves the accuracy with which transportation information systems represent vehicle icons in realistic-looking orientations within a graphical user interface. FIG. 4A illustrates an example client device of a conventional transportation information system depicting a generic vehicle icon 406 (or flat vehicle icon) representing a public transportation vehicle traveling along a route 408 from a stop 402 to a stop 404. As shown in FIG. 4A, the vehicle icon 406 is pointing in an unnatural, unrealistic orientation. Indeed, in rendering the vehicle icon 406 at different positions along the route 408 to represent the travel of a public transportation vehicle, the client device of FIG. 4A renders the vehicle icon 406 such that the vehicle icon 406 drifts around a corner, failing to reflect proper orientations throughout the turn (or failing to change orientation at all). In addition, the route 408 of FIG. 4A inaccurately reflects the travel of the public transportation vehicle corresponding to the vehicle icon 406. Indeed, the route 408 has square corners to indicate changes in travel direction, but the route 408 is incapable of accommodating any representation of changes in orientation of the vehicle icon 406 as the public transportation vehicle travels around a corner.

Figure 4B:
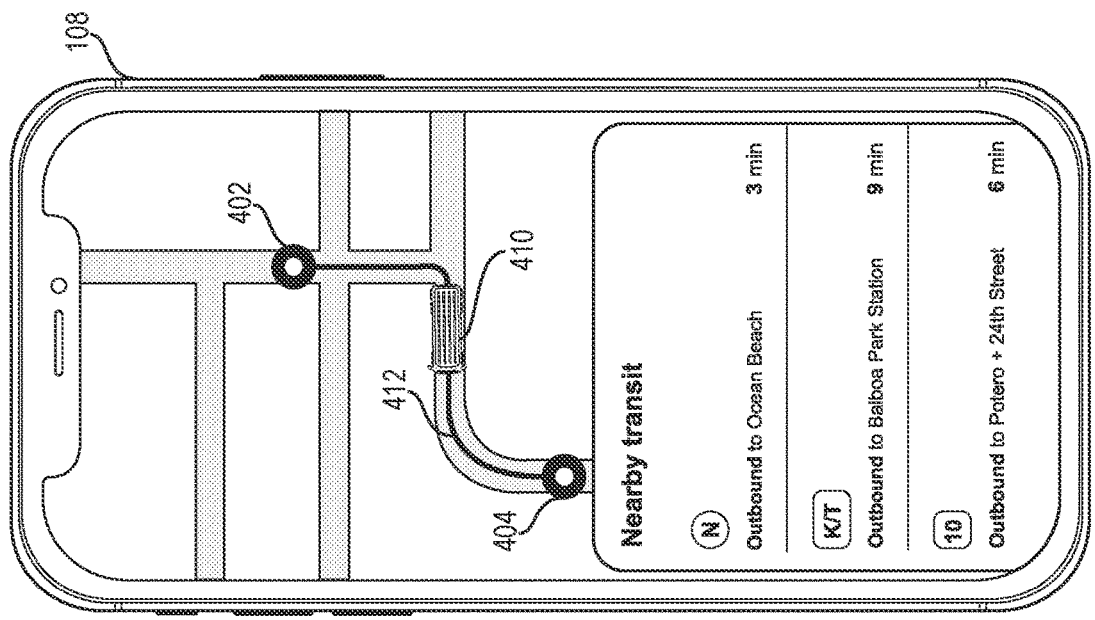
FIGS. 4A-4B illustrate an example comparison of the vehicle-icon-animation system with conventional systems in illustrating vehicle icons in accordance with one or more embodiments.
Figure 4A:
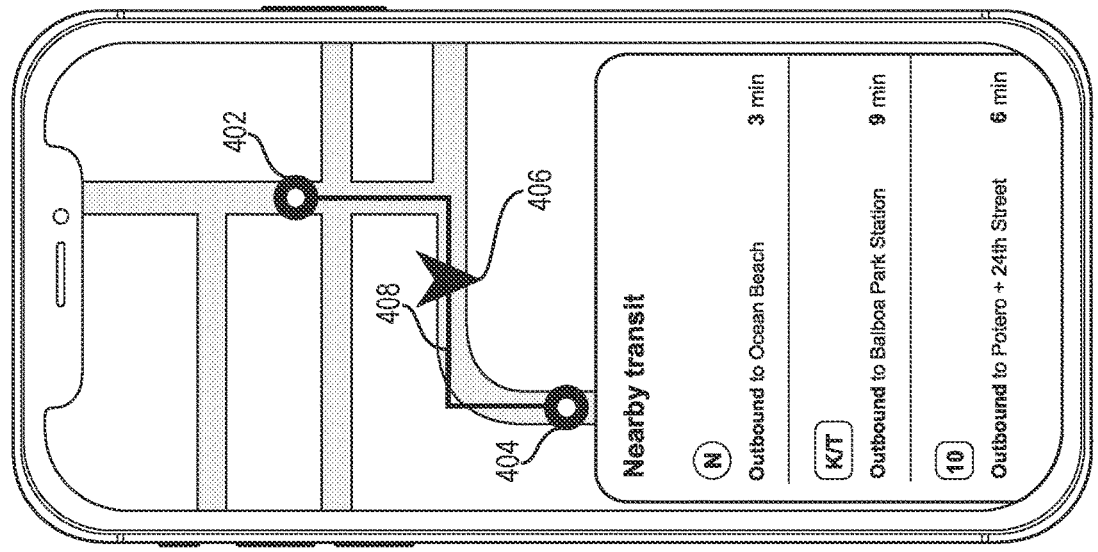

In FIG. 4B, by contrast, the client device 108 associated with the vehicle-icon-animation system 104 renders a vehicle icon 410 to reflect appropriate orientations at various locations along a predicted route 412. Indeed, FIG. 4B illustrates the client device 108 presenting a graphical map display that includes a vehicle icon 410 representing a public transportation vehicle traveling along the predicted route 412 from a stop 402 to a stop 404, in accordance with one or more embodiments. As illustrated in FIG. 4B, the client device 108 renders the vehicle icon 410 at a position comparable to the position of the vehicle icon 406 in FIG. 4A, but with a more accurate orientation. Indeed, the client device 108 associated with the vehicle-icon-animation system 104 accurately determines render orientations for the vehicle icon 410 at various predicted locations along the predicted route 412. The client device 108 further renders the vehicle icon 410 to point in the render orientations at respective predicted location points. Further, the predicted route 412 of FIG. 4B represents a curved path for rendering changes in the orientation of the vehicle icon 410 as the public transportation vehicle travels around the curve.

Figure 5B:
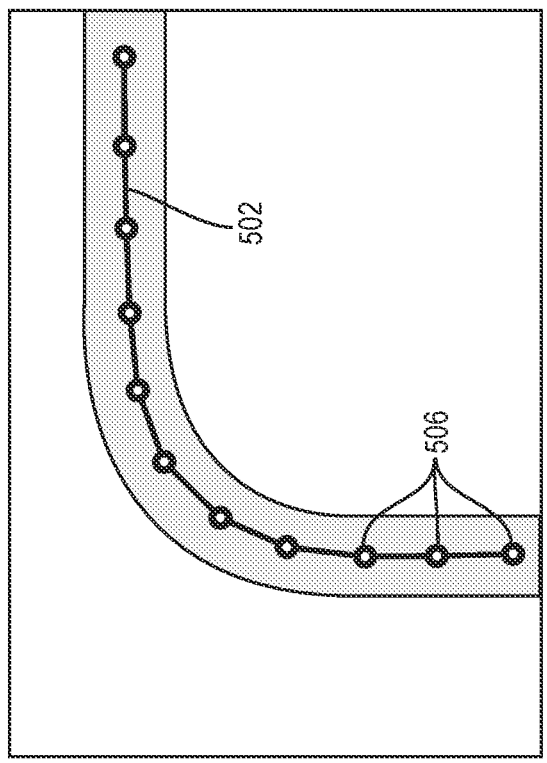
FIGS. 5A-5B illustrate an example of generating a predicted route and predicted location points in accordance with one or more embodiments.
Figure 5A:
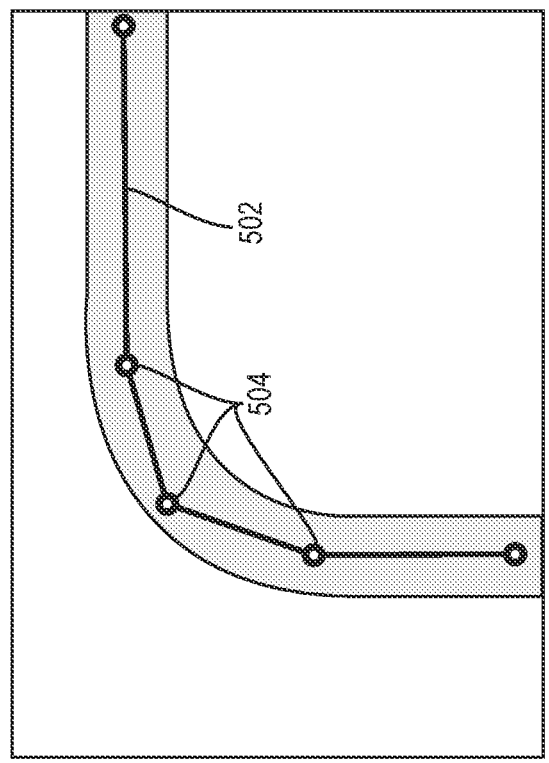

As mentioned, the vehicle-icon-animation system 104 can generate a predicted route and predicted location points for a public transportation vehicle. Indeed, FIG. 5A illustrates a predicted route 502 that the vehicle-icon-animation system 104 generates in accordance with one or more embodiments. In addition, FIG. 5B illustrates predicted location points 506 that the vehicle-icon-animation system 104 generates along the predicted route 502 in accordance with one or more embodiments.

As shown in FIG. 5A, the vehicle-icon-animation system 104 generates the predicted route 502 based on public transit information received from a public transportation system (e.g., the public transportation system 112). In particular, the vehicle-icon-animation system 104 receives public transit information to indicate a recent location, a recent bearing, and/or a recent speed of a public transportation vehicle. In some cases, such a location, bearing, and speed is current or near current. Based on the public transit information, the vehicle-icon-animation system 104 identifies the predicted route 502 from a repository of public transportation routes as the predicted route for the public transportation vehicle.

As described above, to generate the predicted route 502, the vehicle-icon-animation system 104 generates a route polyline by linking or connecting location points (as indicated by the empty circles) such as the location points 504 with line segments. In addition, the vehicle-icon-animation system 104 determines the location points 504 based on indicated locations of the public transportation vehicles. For example, the vehicle-icon-animation system 104 receives historical public transit information that indicates various locations of public transportation vehicles. The vehicle-icon-animation system 104 connects the indicated historical locations with line segments to generate the predicted route 502. In some embodiments, the vehicle-icon-animation system 104 determines average locations from clusters or groups of historical locations to utilize as the location points 504.

For example, the vehicle-icon-animation system 104 determines clusters of historical locations of public transportation vehicles that are within a threshold distance of each other. The vehicle-icon-animation system 104 further determines average or composite locations for each cluster. In some embodiments, the vehicle-icon-animation system 104 determines a weighted average by, for example, weighting historical locations of public transportation vehicles of the same type as a current public transportation vehicle (e.g., a bus) more heavily than other types of public transportation vehicles (e.g., a train or ferry). Thus, the vehicle-icon-animation system 104 can generate average locations for a cluster that skew toward more heavily weighted historical locations.

In addition, the vehicle-icon-animation system 104 determines that a public transportation vehicle is traveling along the predicted route 502 based on public transit information indicating a bearing and a location of the public transportation vehicle. As mentioned, based on determining that the public transportation vehicle is traveling along the predicted route 502, the vehicle-icon-animation system 104 can further generate predicted location points. For instance, based on the indicated bearing and the indicated location of the public transportation vehicle, the vehicle-icon-animation system 104 can determine geometric projections of locations along the predicted route 502. FIG. 5B illustrates the predicted route 502 including predicted location points 506 in accordance with one or more embodiments.

As shown in FIG. 5B, the vehicle-icon-animation system 104 generates the predicted location points 506 along the predicted route 502 to indicate locations where the public transportation vehicle is expected to be located at particular times during transit. Indeed, the vehicle-icon-animation system 104 can generate the predicted location points 506 spaced at one second intervals (or other travel-time intervals or distance intervals), starting from a location of the public transportation vehicle as indicated by public transit information. For example, to generate the predicted location points 506, the vehicle-icon-animation system 104 determines geometric projections (on the route polyline) for the travel of the public transportation vehicle based on its location and bearing. In some embodiments, as shown in FIG. 5B, the vehicle-icon-animation system 104 modifies the predicted route 502 to include additional line segments within the polyline between predicted location points.

In these or other embodiments, the vehicle-icon-animation system 104 determines the predicted location points 506 along the predicted route 502 based on a size of a vehicle icon. In particular, the vehicle-icon-animation system 104 determines dimensions of a vehicle icon (e.g., the vehicle icon 410) and determines where to place the predicted location points 506 based on the dimensions. For example, in some cases, the vehicle-icon-animation system 104 determines that longer vehicle icons represent longer public transportation vehicles that may require more gradual turns around corners. In some embodiments, the vehicle-icon-animation system 104 adds or removes predicted location points based on the size of the vehicle icon. Thus, the vehicle-icon-animation system 104 can change the location of one or more predicted location points (and/or changes the subsequent predicted location points used to generate intersecting lines for render orientations, as described below) to accommodate more gradual turns and therefore render the vehicle icon accordingly.

In one or more embodiments, the vehicle-icon-animation system 104 generates the predicted location points 506 based on predicted orientations. As described below, the vehicle-icon-animation system 104 determines render orientations based on the predicted location points 506, but the vehicle-icon-animation system 104 can also utilize a threshold orientation change (or a threshold change in orientation angle) to determine placement of one or more of the predicted location points 506. For example, in some cases, the vehicle-icon-animation system 104 determines that the change in orientation for rendering a vehicle icon between a first predicted location point and a second predicted location point exceeds a threshold orientation change. The vehicle-icon-animation system 104 therefore modifies the location of the first and/or second predicted location point (and/or their respective subsequent predicted location points for generating intersecting lines, as described below) to reduce the change in orientation to no longer exceed the threshold. In some embodiments, the vehicle-icon-animation system 104 also (or alternatively) adds or removes predicted location points as necessary to reduce orientation changes along the predicted route. Thus, while rendering the vehicle icon along the predicted route 502, the vehicle-icon-animation system 104 (or the client device 108) can present a smooth animation without jarring changes in vehicle icon orientation.

Figure 6:
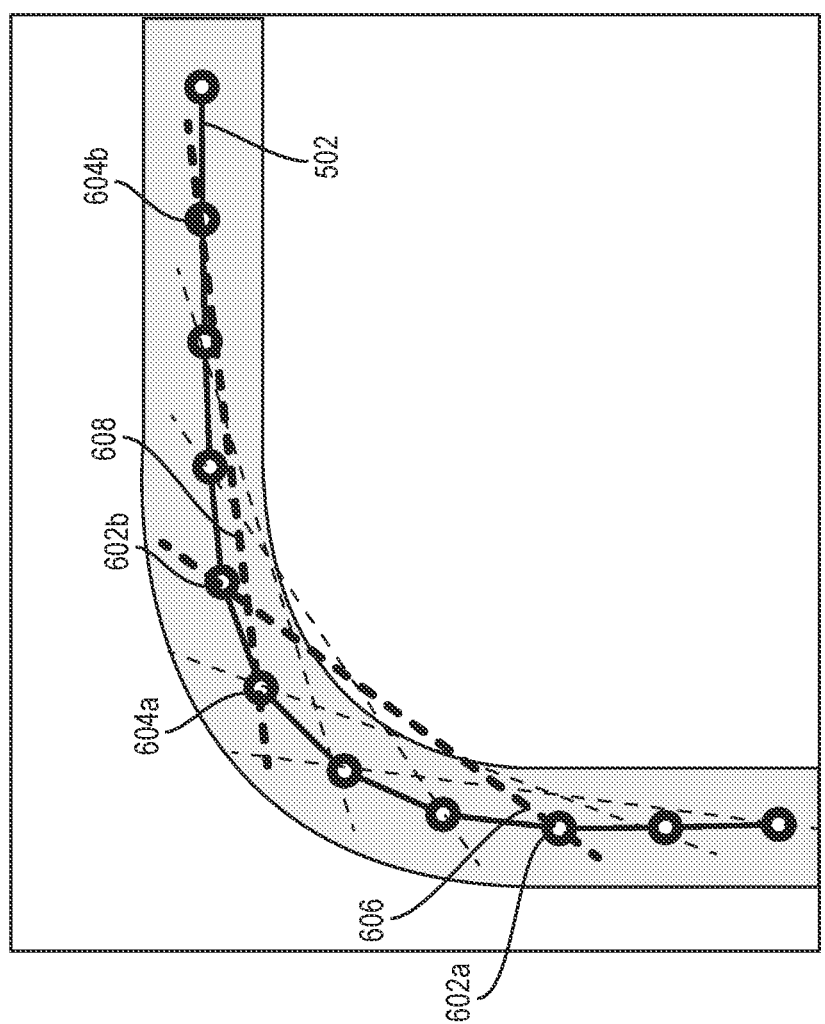
FIG. 6 illustrates an example of determining render orientations in accordance with one or more embodiments.

As mentioned, the vehicle-icon-animation system 104 (or the client device 108) can determine render orientations for a public transportation vehicle traveling along a predicted route (e.g., the predicted route 502). FIG. 6 illustrates generating render orientations along the predicted route 502 in accordance with one or more embodiments. As shown, the vehicle-icon-animation system 104 determines render orientations based on predicted location points (e.g., the predicted location points 506).

To elaborate, the vehicle-icon-animation system 104 (or the client device 108) determines render orientations by generating intersecting lines between predicted location points and orientating a vehicle icon along the intersecting lines. As illustrated in FIG. 6, for instance, the vehicle-icon-animation system 104 determines a most recently predicted location point or a predicted location point that a public transportation vehicle has most recently passed while traveling along the predicted route 502. Indeed, the public transportation vehicle may be located (or predicted to be located) either on or between predicted location points (e.g., the predicted location points 506) along the predicted route 502. Thus, the vehicle-icon-animation system 104 (or the client device 108) determines a most recently predicted location point associated with the public transportation vehicle based on the predicted travel of the public transportation vehicle in accordance with the public transit information.

In addition, the vehicle-icon-animation system 104 (or the client device 108) determines a subsequent predicted location point corresponding to the most recently predicted location point for generating an intersecting line. Indeed, the vehicle-icon-animation system 104 identifies a subsequent predicted location point that is the farthest predicted location point within a threshold distance (e.g., 50 meters or 100 meters) from (i) the predicted current location of the public transportation vehicle or (ii) the most recently predicted location point.

As shown in FIG. 6, for example, the vehicle-icon-animation system 104 identifies a most recently predicted location point 602a and a subsequent predicted location point 602b that is the farthest predicted location point within a threshold distance from either the predicted current location of the public transportation vehicle or the most recently predicted location point 602a. The vehicle-icon-animation system 104 further generates the intersecting line 606 (bolded in FIG. 6 for clarity) between (or that crosses or intersects) the most recently predicted location point 602a and the subsequent predicted location point 602b. Thus, when rendering the vehicle icon, the vehicle-icon-animation system 104 (or the client device 108) can render the vehicle icon to point in an orientation or direction along the intersecting line at all rendering points for the vehicle icon (i.e., frames of the animation) from the most recently predicted location point 602 to the next predicted location point on the predicted route 502. Upon crossing the next predicted location point, the vehicle-icon-animation system 104 (or the client device 108) updates the display to render the vehicle icon pointing in a different orientation (per a new intersecting line) as it progresses along the predicted route 502.

Indeed, as further shown in FIG. 6, the vehicle-icon-animation system 104 (or the client device 108) generates a subsequent render orientation once the public transportation vehicle passes the predicted location point 604a (traveling in the direction from the predicted location point 602a). For example, the vehicle-icon-animation system 104 generates an intersecting line 608 (bolded in FIG. 6 for clarity) between the predicted location point 604*a* and the predicted location point 604*b* (the farthest point within the threshold distance). Thus, the vehicle-icon-animation system 104 determines the render orientation for rendering the vehicle icon when the public transportation vehicle is predicted to be located between the predicted location points 604*a* and 602*b*. Similarly, the vehicle-icon-animation system 104 generates render orientations for the public transportation vehicle at other locations along the predicted route 502. Thus, the vehicle-icon-animation system 104 (or the client device 108) renders the vehicle icon pointing in different render orientations as the public transportation vehicle is predicted to pass each successive predicted location point along the predicted route 502.

In one or more embodiments, the vehicle-icon-animation system 104 utilizes predicted location points to determine a render orientation in a different way. For example, the vehicle-icon-animation system 104 can generate an intersecting line between each predicted location point and its immediately subsequent location point. In these embodiments, the vehicle-icon-animation system 104 determines a render orientation for a public transportation vehicle located between two predicted location points along the intersecting line for the first of the two intersected predicted location points (i.e., the most recently passed intersection point). In other embodiments, the vehicle-icon-animation system 104 generates an intersecting line between a predicted location point and a subsequent predicted location point a particular distance or travel time farther along the predicted route. In still other embodiments, the vehicle-icon-animation system 104 generates an intersecting line between a predicted location point and a subsequent predicted location point a particular number of location points farther along the route.

As mentioned above, the vehicle-icon-animation system 104 can render (or cause the client device 108 to render) a vehicle icon in different positions for a travel animation along a predicted route within a graphical map display. Indeed, the vehicle-icon-animation system 104 can render the vehicle icon to point in different orientations at different locations within the graphical map display. FIGS. 7A-7D illustrate example renderings of a vehicle icon 706 at different locations along a predicted route 708 from an origin 702 (e.g., a stop along a route) to a destination 704 (e.g., another stop along the route). Indeed, based on the processes and techniques described above, the vehicle-icon-animation system 104 determines predicted locations for the public transportation vehicle along the predicted route 708 and renders the vehicle icon 706 at corresponding locations (and pointing in appropriate render orientations) within the graphical map display.

Figure 7B:
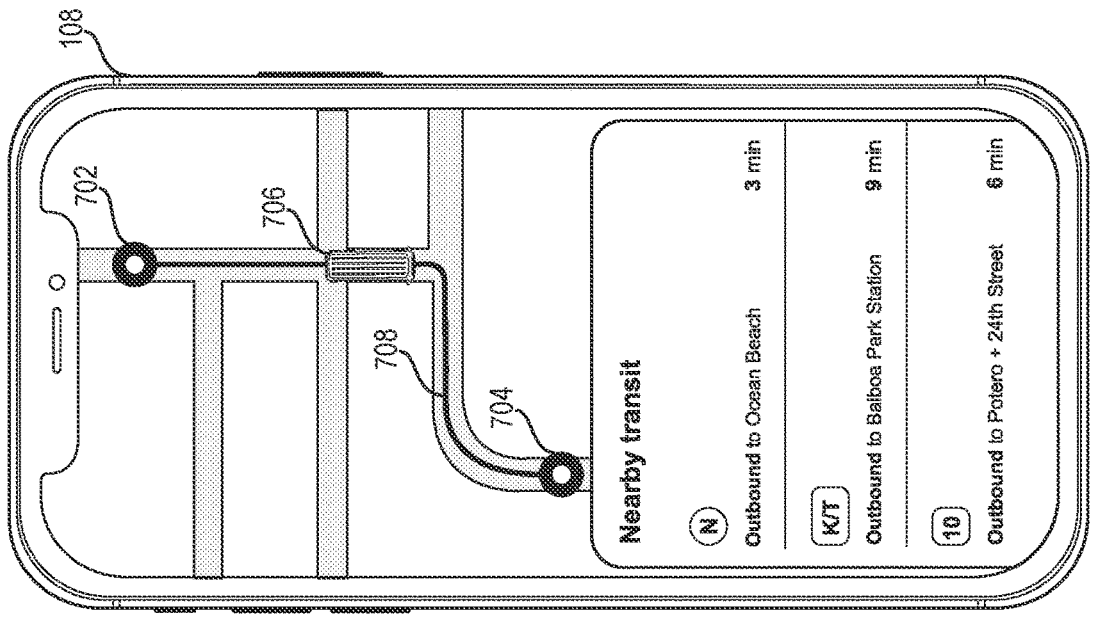
FIGS. 7A-7D illustrate an example series of graphical map displays for rendering a vehicle icon at different locations and orientations along a predicted route in accordance with one or more embodiments.
Figure 7A:
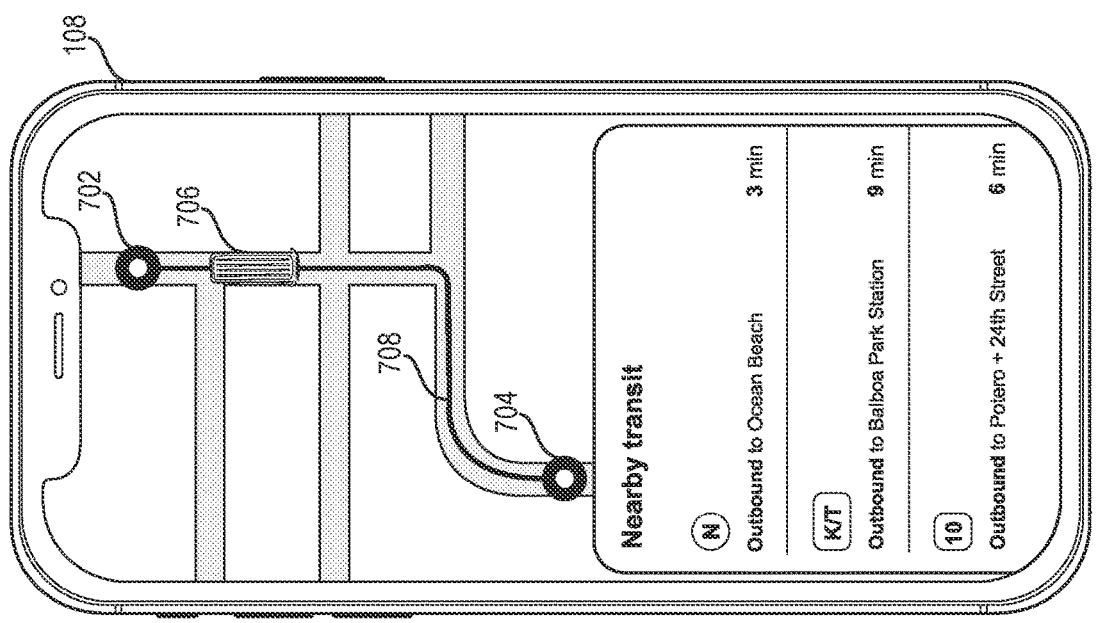

As illustrated in FIG. 7A, for instance, the client device 108 displays the vehicle icon 706 representing a bus at a first predicted location along the predicted route 708. Indeed, the client device 108 receives (from the transportation matching system 102) the predicted route 708 and/or predicted location points along the predicted route 708 to cause the client device to render the vehicle icon 706 at the first predicted location. Not only does the client device 108 render the vehicle icon located at the first predicted location, but the client device 108 also renders the vehicle icon 706 pointing in a corresponding render orientation at the first predicted location.

As the public transportation vehicle moves along the predicted route 708, the client device 108 concurrently continues to predict locations and orientations for the public transportation vehicle. As illustrated in FIG. 7B, for instance, the client device 108 renders the vehicle icon 706 at a subsequent location along the predicted route 708. Because the client device 108 predicts the public transportation vehicle to be traveling in a straight line between FIGS. 7A and 7B, the orientation of the vehicle icon 706 appears the same (or nearly the same) between FIGS. 7A and 7B.

Figure 7D:
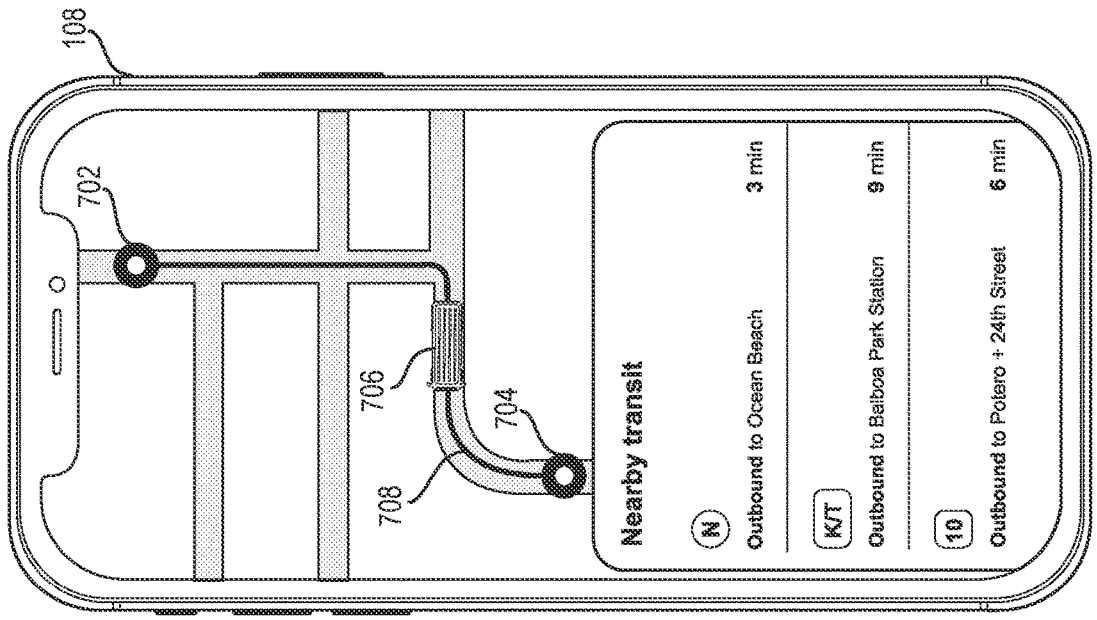
Figure 7C:
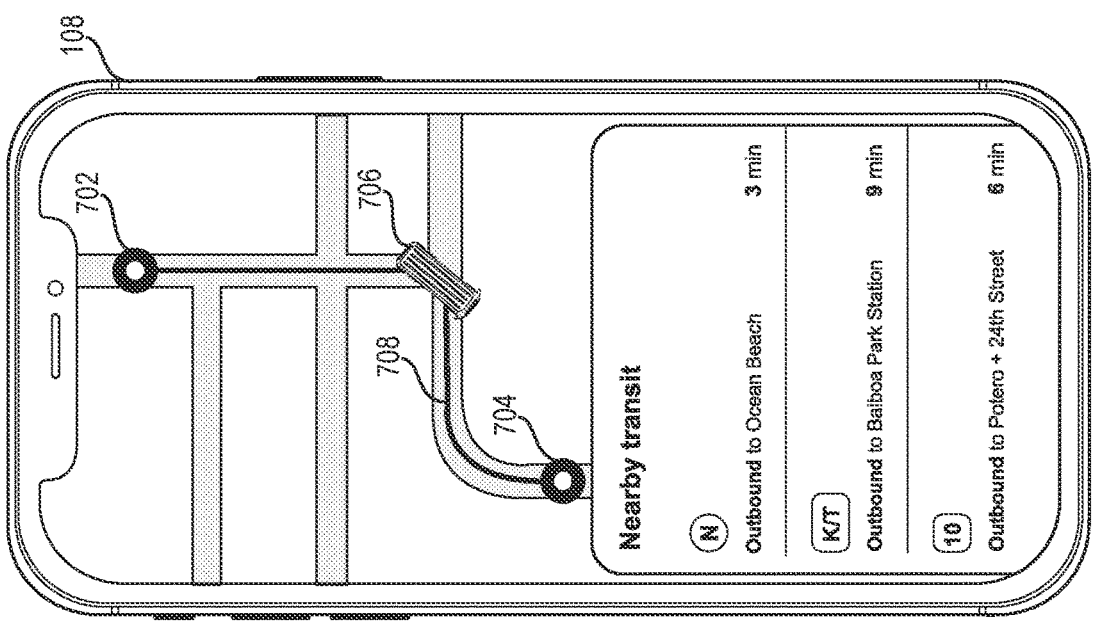

FIG. 7C depicts progress of the public transportation vehicle along the predicted route 708. As shown in FIG. 7C, the client device 108 renders the vehicle icon 706 turning a corner or other bend in a path. As illustrated in FIG. 7C, the client device 108 renders the vehicle icon 706 pointing in a render orientation for at least one frame of the animation for turning the corner in the predicted route 708. Indeed, the client device 108 (or the vehicle-icon-animation system 104) determines the render orientation as described above and renders the vehicle icon 706 to point in the render orientation to realistically depict the predicted travel of the public transportation vehicle. In some embodiments, the client device 108 may render the vehicle icon 706 pointing in multiple render orientations as the public transportation vehicle is predicted to be turning the corner.

As illustrated in FIG. 7D, the client device 108 renders the vehicle icon 706 traveling still further along the predicted route 708. Indeed, the client device 108 of FIG. 7D renders the vehicle icon 706 pointing at a different predicted current location in a different render orientation from those rendered in FIGS. 7B and 7C. Particularly, as a result of continually generating render orientations for the travel of the public transportation vehicle, the client device 108 renders the vehicle icon 706 in FIG. 7D to point straight to the left along the travel route 708 because the public transportation vehicle is predicted to be traveling along the corresponding portion of the predicted route 708. Thus, the client device 108 portrays the travel of the public transportation vehicle by rendering the vehicle icon 706 at different predicted current locations—pointing in realistic-looking orientations—along the predicted route 708 within the graphical map display.

As mentioned above, the vehicle-icon-animation system 104 can determine whether or not to update a graphical map display to render a vehicle icon at a different location (e.g., on a different predicted route) based on updated public transit information. In particular, the vehicle-icon-animation system 104 can receive updated public transit information from the public transportation system 112 and can compare the updated public transit information with predicted information (e.g., a predicted location and/or a render orientation) pertaining to a public transportation vehicle. In some cases, the vehicle-icon-animation system 104 determines that the indicated location of the public transportation vehicle from the updated public transit information is within a threshold distance or travel time from the predicted current location of the public transportation vehicle. In other cases, the vehicle-icon-animation system 104 determines that the indicated location of the public transportation vehicle from the updated public transit information is not within a threshold distance or travel time from the predicted current location of the public transportation vehicle and therefore requires further action.

Upon determining that the indicated location of the public transportation vehicle is within a threshold distance or travel time from its predicted current location, the vehicle-icon-animation system 104 determines that no change is needed for the rendering within the graphical map. Thus, the vehicle-icon-animation system 104 refrains from determining and/or providing an updated predicted route and updated predicted location points to the client device 108. As a result, the client device 108 continues to render the vehicle icon of the public transportation vehicle throughout the animation along its predicted route, refraining from moving the vehicle icon to a different predicted route.

Upon determining that the indicated location of the public transportation vehicle is outside a threshold distance or threshold travel time from its predicted current location, the vehicle-icon-animation system 104 determines an updated predicted route and updated predicted location points along the updated predicted route. In addition, the vehicle-icon-animation system 104 provides the updated predicted route and/or the updated predicted location points to the client device 108 to cause the client device 108 to update the graphical map display. Indeed, FIGS. 8A-8D illustrate the client device 108 updating the graphical map display in accordance with one or more embodiments.

Figure 8B:
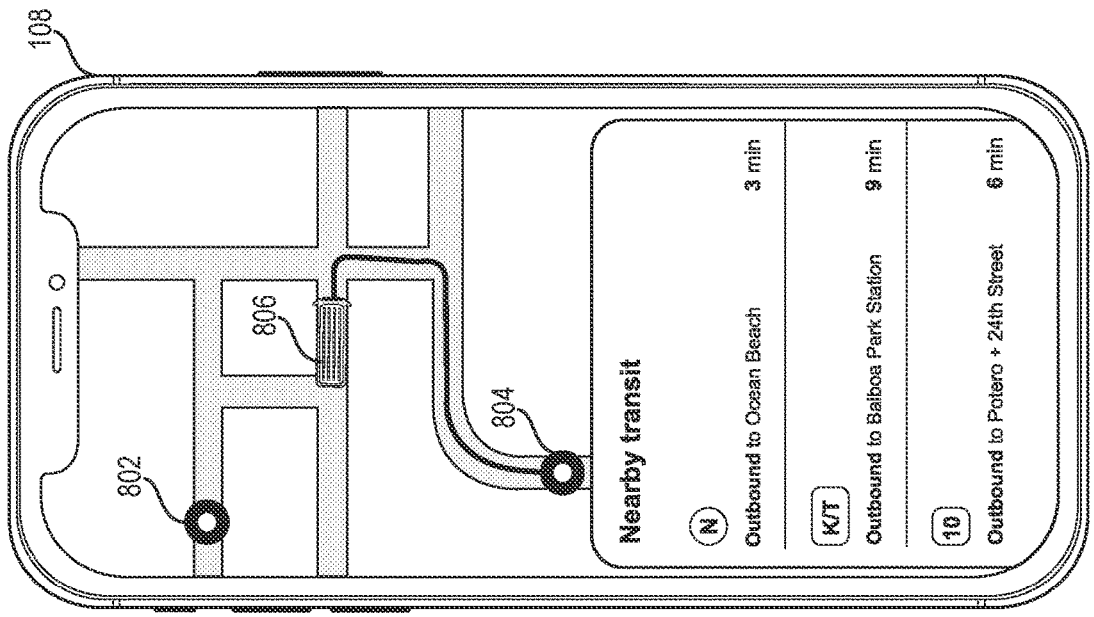
FIGS. 8A-8B illustrate an example of updating a location of a vehicle icon based on updated public transit information in accordance with one or more embodiments.
Figure 8A:
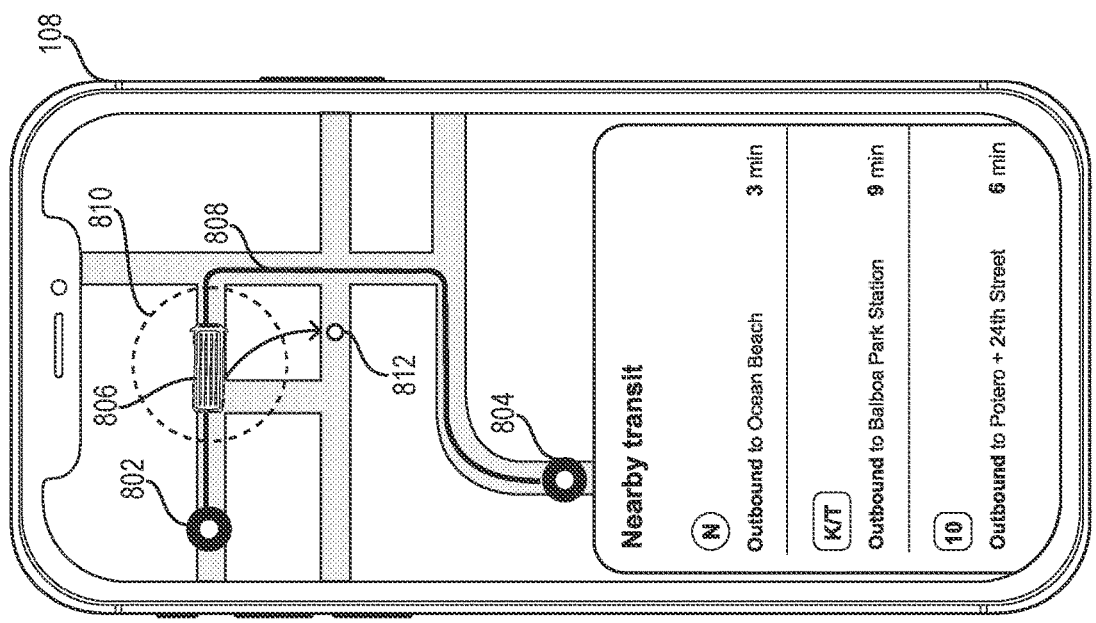

As shown in FIG. 8A, the client device 108 (or the vehicle-icon-animation system 104) determines that the indicated location 812 of the public transportation vehicle is outside a threshold distance from its predicted current location. Indeed, the dashed circle 810 indicates a threshold distance from the predicted current location of the public transportation vehicle. In some embodiments, the client device 108 (or the vehicle-icon-animation system 104) determines a threshold travel time instead, which may not be a uniform circle but may instead be irregular in shape due to different travel speeds on different road segments (or rail segments or waterway segments). In these or other embodiments, the client device 108 does not necessarily show or depict the circle 810 (or other threshold distance/travel time indicator) within the graphical map display.

In any event, upon determining that the public transportation vehicle is located outside a threshold distance or threshold travel time from its predicted current location, the vehicle-icon-animation system 104 causes the client device 108 to update the graphical map display to remove the vehicle icon 806 from its current location within the graphical map display and render the vehicle icon 806 at the indicated location 812 of the public transportation vehicle. As the client device 108 is rendering the vehicle icon 806 along the predicted route 808 (e.g., from the stop 802 to the stop 804), the client device 108 updates the location of the vehicle icon 806. In some embodiments, as part of a transition animation, the client device 108 renders an arrow (as shown in FIG. 8A) or other indicator to illustrate the change in location of vehicle icon 806. In the same or other embodiments, the client device 108 renders a slide or translation of the graphical map to show a change in location of the public transportation vehicle (e.g., to center the vehicle icon 806 within the graphical map display) as part of the transition animation.

As illustrated in FIG. 8B, the client device 108 renders the vehicle icon 806 at the indicated location 812. In addition, the client device 108 (or the vehicle-icon-animation system 104) modifies the predicted route or generates an updated predicted route to illustrate the new route that the public transportation vehicle is traveling. As shown, the client device 108 depicts the vehicle icon 806 traveling to the stop 804 along a different route (e.g., the updated predicted route) than depicted in FIG. 8A. To render the transition animation for FIG. 8B, the client device 108 removes the vehicle icon 806 from the initial location of FIG. 8A and renders the vehicle icon 806 at the indicated location 812 (e.g., in addition or alternatively to rendering the arrow) so that the vehicle icon 806 appears to "snap" into position at the indicated location 812.

Figure 9B:
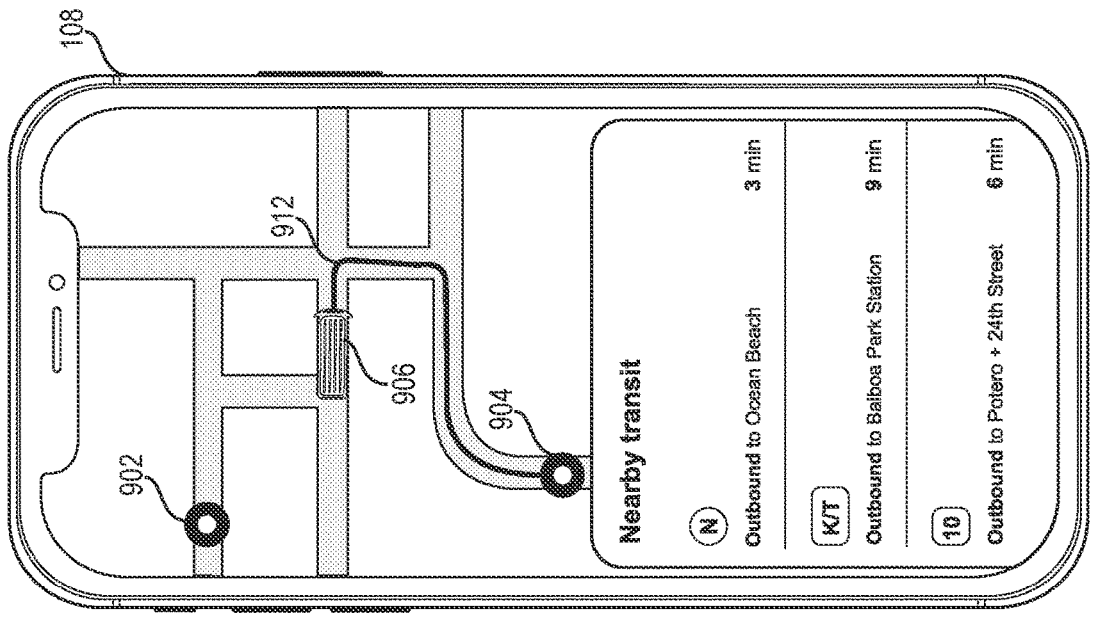
FIGS. 9A-9B illustrate another example of updating a location of a vehicle icon based on updated public transit information in accordance with one or more embodiments.
Figure 9A:
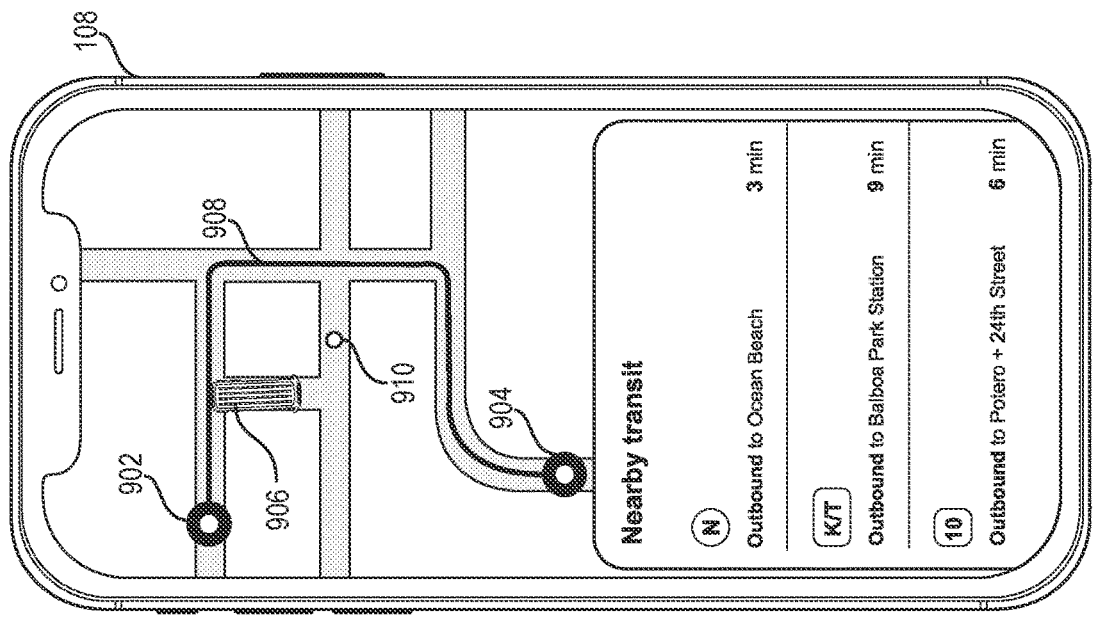

Alternatively, in some embodiments, the client device 108 updates a graphical map display by rendering a vehicle icon at different positions along road segments (or rail segments or waterway segments) that connect a predicted current location of the public transportation vehicle to an indicated location of the public transportation vehicle (e.g., as indicated by updated public transit information). For example, FIGS. 9A-9B illustrate the client device 108 updating a graphical map display by rendering a vehicle icon 906 traveling along connecting road segments. As shown in FIG. 9A, the client device 108 renders the vehicle icon 906 traveling along a predicted route 908 from a stop 902 to a stop 904. As shown in FIG. 9B, the client device 108 updates the display of the vehicle icon 906 to render the vehicle icon 906 traveling along an updated predicted route 912 toward the stop 904.

As illustrated in FIG. 9A, based on determining that the public transportation vehicle is outside the threshold distance, the client device 108 renders the vehicle icon 906 traveling along a connecting road segment toward the indicated location 910 (i.e., the location of the public transportation vehicle as indicated by updated public transit information). Indeed, whether or not the public transportation vehicle is actually traveling (or has actually traveled) along the connecting road segments, the client device 108 renders the vehicle icon 906 at different positions along the connecting road segments to animate the transition to the indicated location 910 in a seamless fashion.

As illustrated in FIG. 9B, the client device 108 renders the vehicle icon 906 at the indicated location 910 and traveling along the updated predicted route 912 (as updated from the predicted route 908). Indeed, the client device 108 updates the graphical map to illustrate the updated predicted route 912 and remove the predicted route 908 that was based on old public transit information. By updating the graphical map, the client device 108 (or the vehicle-icon-animation system 104) maintains an up-to-date and realistic-looking representation of the location and orientation of a public transportation vehicle.

Figure 10:
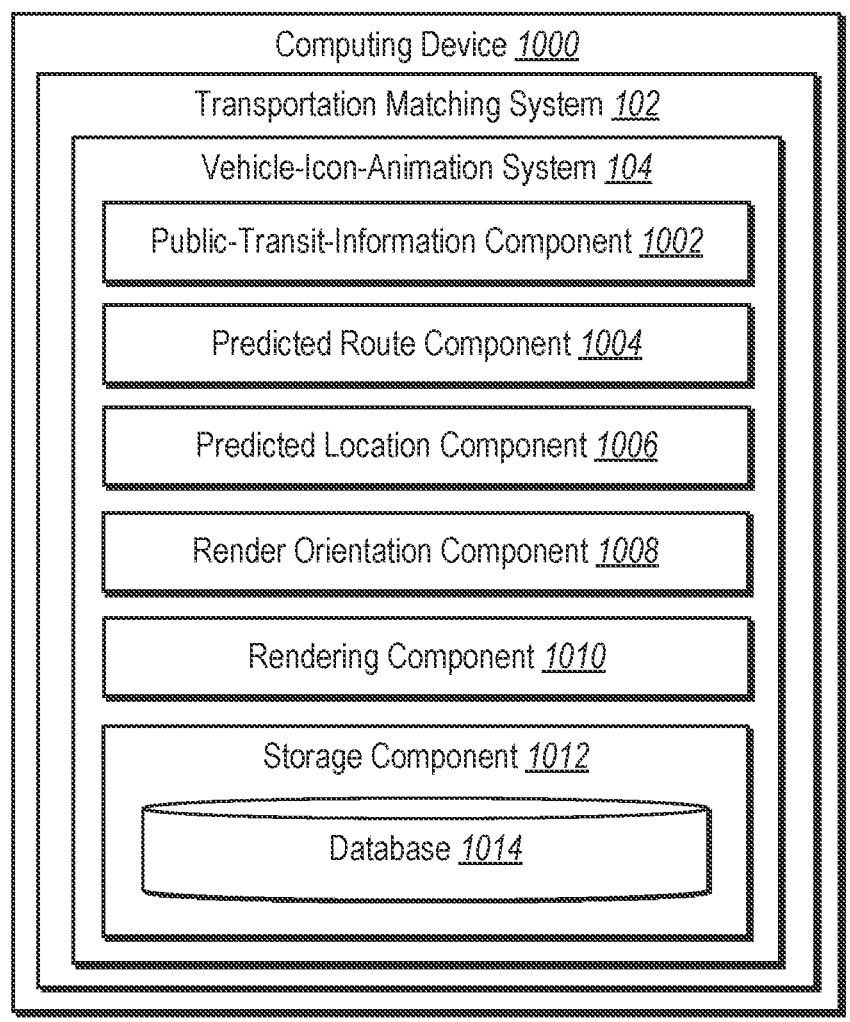
FIG. 10 illustrates a block diagram of an example computing device including various components of a vehicle-icon-animation system in accordance with one or more embodiments.

Looking now to FIG. 10, additional detail will be provided regarding components and capabilities of the vehicle-icon-animation system 104. Specifically, FIG. 10 illustrates an example schematic diagram of the vehicle-icon-animation system 104 on an example computing device 1000 (e.g., one or more of the client device 108 and/or the server(s) 106). As shown in FIG. 10, the vehicle-icon-animation system 104 may include a public transit information component 1002, a predicted route component 1004, a predicted location component 1006, a render orientation component 1008, a rendering component 1010, and a storage component 1012.

As mentioned, the vehicle-icon-animation system 104 includes a public transit information component 1002. In particular, the public transit information component 1002 manages, maintains, accesses, collects, requests, gathers, or receives public transit information for one or more public transportation vehicles. In some embodiments, the public transit information component 1002 communicates with the storage component 1012 to access and/or store public transit information within the database 1014. In these or other embodiments, the public transit information component 1002 receives or accesses updated public transit information and communicates with other components of the vehicle-icon-animation system 104 to generate updates for rendering a vehicle icon within a graphical map display.

As shown, the vehicle-icon-animation system 104 also includes a predicted route component 1004. In particular, the predicted route component 1004 manages, maintains, generates, determines, or provides a predicted route and/or predicted location points along a predicted route based on public transit information (or an updated predicted route/updated predicted location points based on updated public transit information). For example, the predicted route component 1004 accesses public transit information from the database 1014 and generates a predicted route and predicted location points for a public transportation vehicle traveling along the predicted route. In some embodiments, the predicted route component 1004 communicates with the storage component 1012 to store a predicted route (or an updated predicted route) within the database 1014.

As also shown, the vehicle-icon-animation system 104 includes a predicted location component 1006. In particular, the predicted location component 1006 generates, determines, or predicts locations associated with a public transportation vehicle. For example, the predicted location component 1006 generates a predicted current location of a public transportation vehicle based on public transit information (e.g., from the database 1014). In addition, the predicted location component 1006 generates a predicted subsequent location of the public transportation vehicle based on public transit information. Thus, the predicted location component 1006 generates predicted locations for a public transportation vehicle at various times while traveling along a predicted route.

Further, the vehicle-icon-animation system 104 includes a render orientation component 1008. In particular, the render orientation component 1008 generates or determines a render orientation for rendering a vehicle icon representing a public transportation vehicle. For example, the render orientation component 1008 generates an intersecting line between two predicted location points and determines a render orientation along the intersecting line, as described above. In some embodiments, the render orientation component 1008 communicates with the storage component 1012 to store the render orientation within the database 1014.

As illustrated, the vehicle-icon-animation system 104 further includes a rendering component 1010. In particular, the rendering component 1010 renders, displays, animates, provides, or presents one or more graphical elements such as a graphical map display including a vehicle icon. For example, the rendering component renders a vehicle icon at different positions along a predicted route and pointing in different render orientations along the route. In some embodiments, the rendering component 1010 receives or accesses (e.g., from the database 1014) predicted locations and corresponding render orientations. For example, the rendering component 1010 receives a predicted current location of a public transportation vehicle and a corresponding render orientation and renders a vehicle icon to point in the render orientation at the predicted current location.

In one or more embodiments, each of the components of the vehicle-icon-animation system 104 are in communication with one another using any suitable communication technologies. Additionally, the components of the vehicle-icon-animation system 104 can be in communication with one or more other devices including one or more client devices described above. It will be recognized that although the components of the vehicle-icon-animation system 104 are shown to be separate in FIG. 10, any of the subcomponents may be combined into fewer components, such as into a single component, or divided into more components as may serve a particular implementation. Furthermore, although the components of FIG. 10 are described in connection with the vehicle-icon-animation system 104, at least some of the components for performing operations in conjunction with the vehicle-icon-animation system 104 described herein may be implemented on other devices within the environment.

The components of the vehicle-icon-animation system 104 can include software, hardware, or both. For example, the components of the vehicle-icon-animation system 104 can include one or more instructions stored on a computer-readable storage medium and executable by processors of one or more computing devices (e.g., the computing device 1000). When executed by the one or more processors, the computer-executable instructions of the vehicle-icon-animation system 104 can cause the computing device 1000 to perform the methods described herein. Alternatively, the components of the vehicle-icon-animation system 104 can comprise hardware, such as a special purpose processing device to perform a certain function or group of functions. Additionally or alternatively, the components of the vehicle-icon-animation system 104 can include a combination of computer-executable instructions and hardware.

Furthermore, the components of the vehicle-icon-animation system 104 performing the functions described herein may, for example, be implemented as part of a stand-alone application, as a module of an application, as a plug-in for applications including content management applications, as a library function or functions that may be called by other applications, and/or as a cloud-computing model. Thus, the components of the vehicle-icon-animation system 104 may be implemented as part of a stand-alone application on a personal computing device or a mobile device. Alternatively or additionally, the components of the vehicle-icon-animation system 104 may be implemented in any application that allows creation and delivery of marketing content to users, including, but not limited to, various applications.

FIGS. 1-10, the corresponding text, and the examples provide a number of different systems, methods, and non-transitory computer readable media for generating and providing render orientations for a vehicle icon representing a public transportation vehicle. In addition to the foregoing, embodiments can also be described in terms of flowcharts comprising acts for accomplishing a particular result. For example, FIG. 11 illustrates a flowchart of an example sequence of acts in accordance with one or more embodiments.

Figure 11:
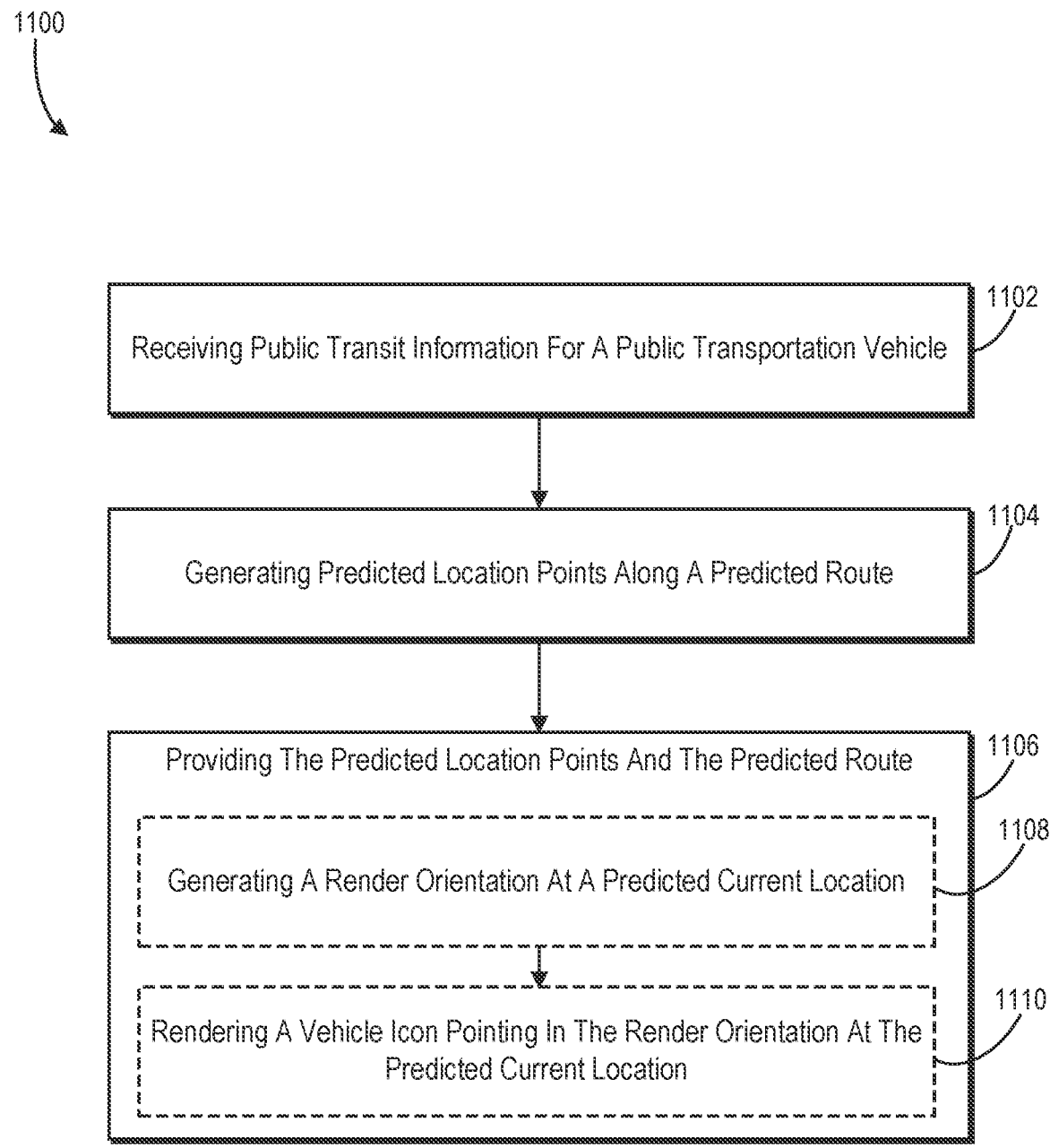
FIG. 11 illustrates an example flow of acts for rendering a vehicle icon representing a public transportation vehicle to reflect a predicted current location and a render orientation for the public transportation vehicle in accordance with one or more embodiments.

While FIG. 11 illustrates acts according to some embodiments, alternative embodiments may omit, add to, reorder, and/or modify any of the acts shown in FIG. 11. The acts of FIG. 11 can be performed as part of a method. Alternatively, a non-transitory computer readable medium can comprise instructions, that when executed by one or more processors, cause a computing device to perform the acts of FIG. 11. In still further embodiments, a system can perform the acts of FIG. 11. Additionally, the acts described herein may be repeated or performed in parallel with one another or in parallel with different instances of the same or other similar acts.

FIG. 11 illustrates an example series of acts 1100 for generating and providing render orientations for a vehicle icon representing a public transportation vehicle. The series of acts 1100 can include an act 1102 of receiving public transit information for a public transportation vehicle. The act 1102 can involve receiving, from a public transportation system, public transit information indicating a bearing and a location for a public transportation vehicle.

As shown, the series of acts 1100 can include an act 1104 of generating predicted location points along a predicted route. In particular, the act 1104 can involve based on the public transit information for the public transportation vehicle, generating predicted location points along a predicted route for the public transportation vehicle. The act 1104 can involve generating the predicted location points along the predicted route by generating geometric projections spaced along the predicted route at travel-time intervals based on the public transit information for the public transportation vehicle. In some embodiments, the predicted location points are spaced along the predicted route at travel-time intervals.

As further shown, the series of acts 1100 can include an act 1106 of providing the predicted location points and the predicted route. In particular, the act 1106 can involve providing the predicted location points and the predicted route to a client device to cause the client device to determine a render orientation for the public transportation vehicle at a predicted current location and render, within a graphical map display, a vehicle icon representing the public transportation vehicle traveling along the predicted route and pointing in the render orientation at the predicted current location. In some embodiments, the act 1106 can involve providing the predicted location points and the predicted route to the client device to further cause the client device to generate, for the public transportation vehicle at a subsequent predicted location along the predicted route, a subsequent render orientation different from the render orientation and render, within the graphical map display, the vehicle icon for the public transportation vehicle pointing in the subsequent render orientation at the subsequent predicted location along the predicted route.

In some embodiments, the act 1106 can involve an act 1108 of determining (or causing a client device to generate) a render orientation at a predicted current location. For example, the act 1108 can include based on the predicted location points, generating a render orientation for the public transportation vehicle at a predicted current location along the predicted route. In one or more embodiments, the series of acts 1100 includes an act of receiving, from a transportation matching system, predicted location points for a public transportation vehicle traveling along a predicted route. Based on the predicted location points, the act 1108 can involve generating a render orientation for the public transportation vehicle at a predicted current location along the predicted route. In these or other embodiments, the series of acts 1100 includes receiving an updated predicted route and updated predicted location points for the public transportation vehicle based on a determination that the public transportation vehicle is located outside a threshold distance from the predicted current location.

In addition, the act 1106 can involve an act 1110 of rendering (or causing a client device to render) a vehicle icon pointing in the render orientation at the predicted current location. In particular, the act 1110 can include rendering, within a graphical map display, a vehicle icon representing the public transportation vehicle traveling along the predicted route and pointing in the render orientation at the predicted current location. In one or more embodiments, the act 1108 can involve determining an intersecting line between a most recent predicted location point (e.g., a predicted location point most recently passed by the public transportation vehicle traveling along the predicted route) and a subsequent predicted location point within a threshold distance from the most recent predicted location point and determining an orientation along the intersecting line as the render orientation. Similarly, in some embodiments, the act 1108 can involve determining an intersecting line between a most recent predicted location point and a subsequent predicted location point within a threshold distance from the most recent predicted location point and aligning the render orientation with the intersecting line. In some embodiments, the series of acts 1100 can include refraining from rendering the vehicle icon on an updated predicted route based on a determination that the public transportation vehicle is located within a threshold distance from the predicted current location.

The series of acts 1100 can include additional acts, such as receiving, from the public transportation system, updated public transit information for the public transportation vehicle, based on the updated public transit information, determining that the public transportation vehicle is located outside a threshold distance from the predicted current location, and based on determining that the public transportation vehicle is located outside the threshold distance, generating updated predicted location points along an updated predicted route for the public transportation vehicle. In addition, the series of acts 1100 can include an act of providing the updated predicted location points and the updated predicted route to the client device to cause the client device to, based on the updated predicted location points, determine an updated render orientation for the public transportation vehicle at an updated predicted current location along the updated predicted route, and render, within the graphical map display, the vehicle icon for the public transportation vehicle traveling along the updated predicted route and pointing in the updated render orientation at the updated predicted current location.

In some embodiments, the series of acts 1100 further includes an act of providing the updated predicted location points and the updated predicted route to the client device to further cause the client device to, based on determining that the public transportation vehicle is located outside the threshold distance, update the graphical map display to represent the vehicle icon on the updated predicted route by one of rendering, within the graphical map display, the vehicle icon at different positions along road segments connecting the predicted current location to an indicated location of the public transportation vehicle or rendering a transition animation by removing the vehicle icon from the predicted current location and rendering the vehicle icon at the indicated location within the graphical map display.

The series of acts 1100 can include acts of receiving, from the public transportation system, updated public transit information for the public transportation vehicle, based on the updated public transit information, determining that the public transportation vehicle is located within a threshold distance from a predicted current location for the public transportation vehicle, and based on determining that the public transportation vehicle is located within the threshold distance, refraining from updating the predicted route and the predicted location points.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
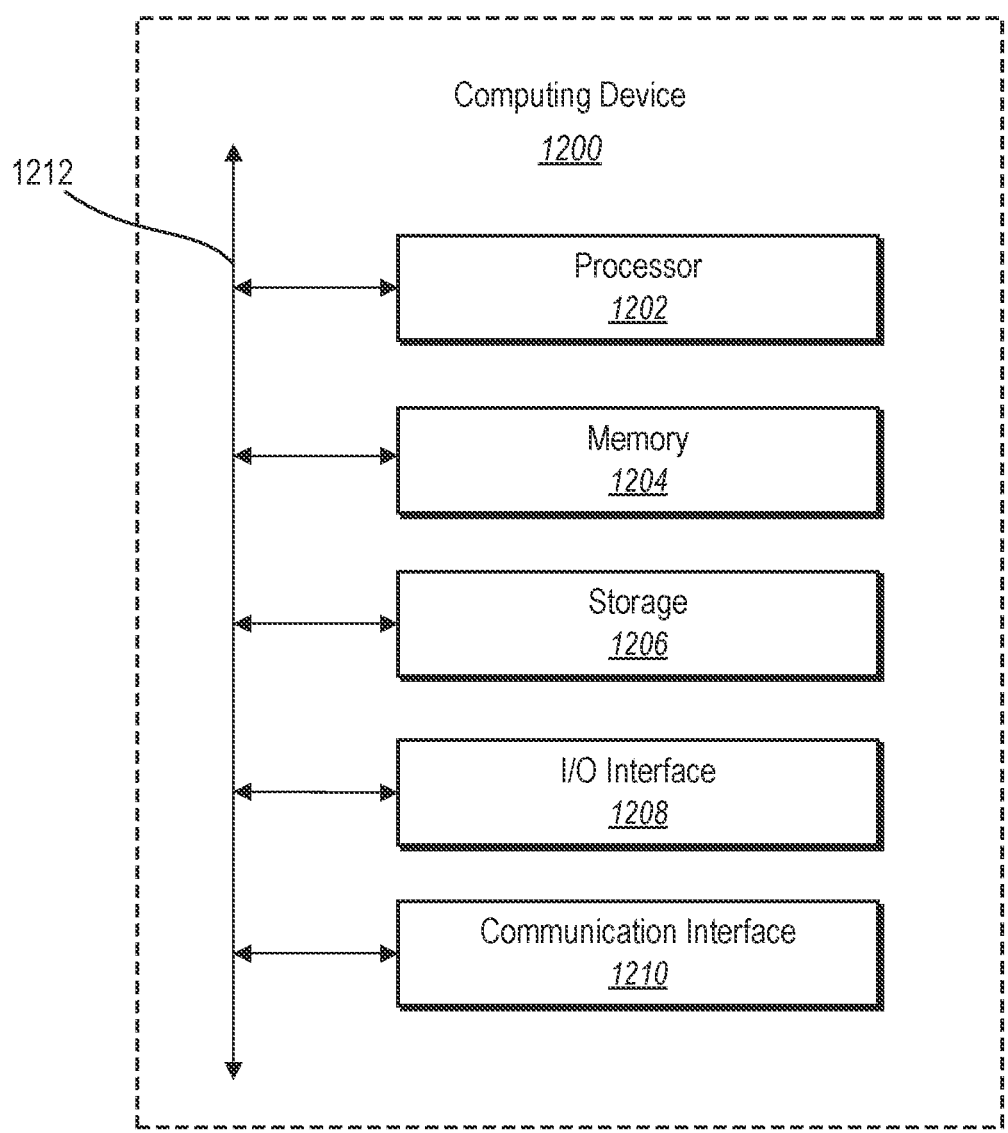
FIG. 12 illustrates a block diagram of a computing device for implementing one or more embodiments of the present disclosure.

FIG. 12 illustrates, in block diagram form, an exemplary computing device 1200 (e.g., the computing device 1000) that may be configured to perform one or more of the processes described above. One will appreciate that the vehicle-icon-animation system 104 can comprise implementations of the computing device 1200, including, but not limited to, the client device 108 and/or the server(s) 106. As shown by FIG. 12, the computing device can comprise a processor 1202, memory 1204, a storage device 1206, an I/O interface 1208, and a communication interface 1210. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, storage device 1206 can comprise a non-transitory storage medium described above. The storage device 1206 may include a hard disk drive ("HDD"), flash memory, a Universal Serial Bus ("USB") drive or a combination of these or other storage devices.

The computing device 1200 also includes one or more input or output interface 1208 (or "I/O interface 1208"), which are provided to allow a user (e.g., requester or provider) to provide input to (such as user strokes), receive output from, and otherwise transfer data to and from the computing device 1200. These I/O interface 1208 may include a mouse, keypad or a keyboard, a touch screen, camera, optical scanner, network interface, modem, other known I/O devices or a combination of such I/O interface 1208. The touch screen may be activated with a stylus or a finger.

The I/O interface 1208 may include one or more devices for presenting output to a user, including, but not limited to, a graphics engine, a display (e.g., a display screen), one or more output providers (e.g., display providers), one or more audio speakers, and one or more audio providers. In certain embodiments, interface 1208 is configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 can provide one or more interfaces for communication (such as, for example, packet-based communication) between the computing device and one or more other computing devices 1200 or one or more networks. As an example, and not by way of limitation, communication interface 1210 may include a network interface controller ("NIC") or network adapter for communicating with an Ethernet or other wire-based network or a wireless NIC ("WNIC") or wireless adapter for communicating with a wireless network, such as a WI-FI. The computing device 1200 can further include a bus 1212. The bus 1212 can comprise hardware, software, or both that connects components of computing device 1200 to each other.

Figure 13:
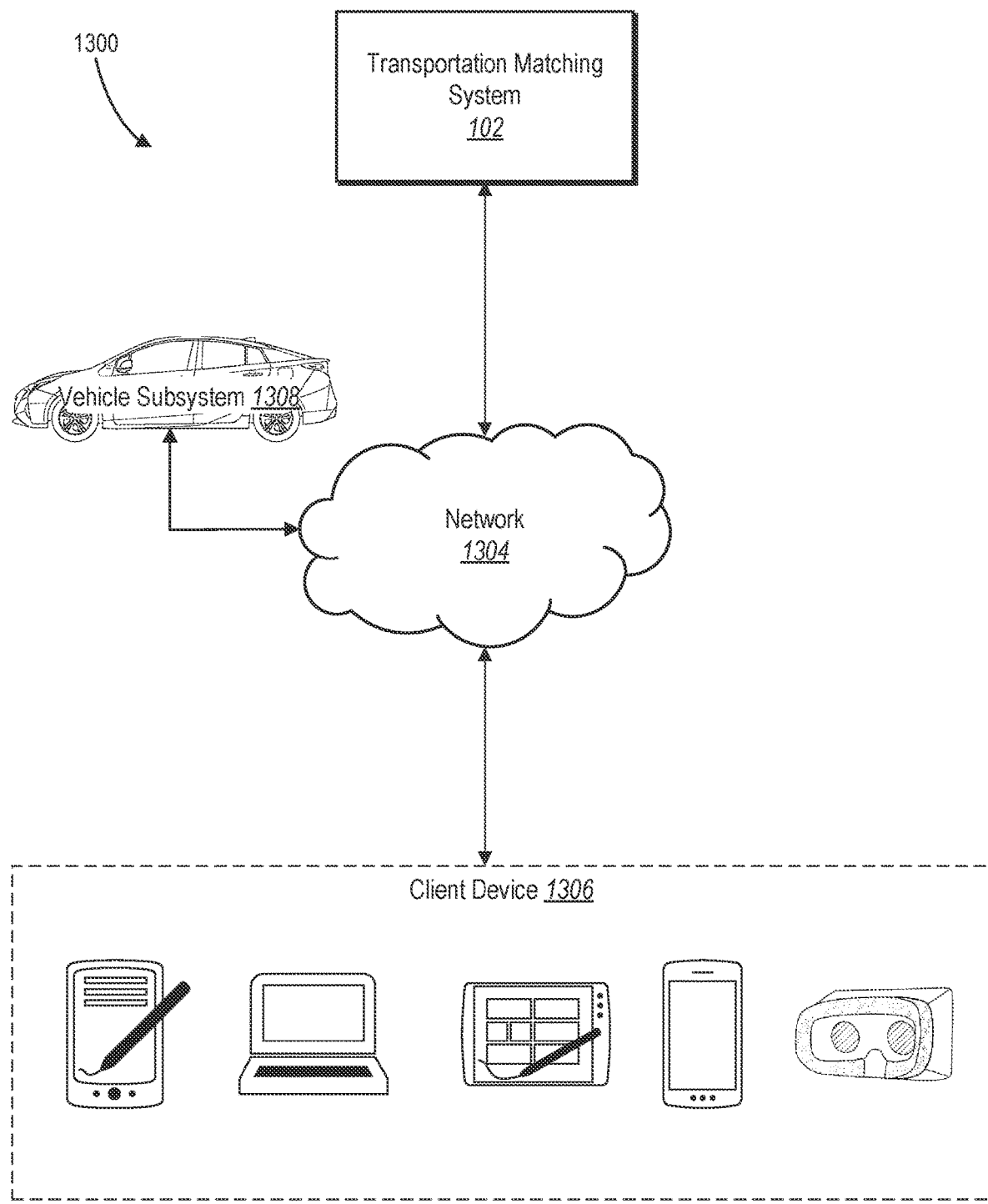
FIG. 13 illustrates an example environment for a transportation matching system in accordance with one or more embodiments.

FIG. 13 illustrates an example network environment 1300 of the transportation matching system 102. The network environment 1300 includes a client device 1306 (e.g., the client device 108), a transportation matching system 102, and a vehicle subsystem 1308 connected to each other by a network 1304. Although FIG. 13 illustrates a particular arrangement of the client device 1306, the transportation matching system 102, the vehicle subsystem 1308, and the network 1304, this disclosure contemplates any suitable arrangement of client device 1306, the transportation matching system 102, the vehicle subsystem 1308, and the network 1304. As an example, and not by way of limitation, two or more of client device 1306, the transportation matching system 102, and the vehicle subsystem 1308 communicate directly, bypassing network 1304. As another example, two or more of client device 1306, the transportation matching system 102, and the vehicle subsystem 1308 may be physically or logically co-located with each other in whole or in part.

Moreover, although FIG. 13 illustrates a particular number of client devices 1306, transportation matching systems 102, vehicle subsystems 1308, and networks 1304, this disclosure contemplates any suitable number of client devices 1306, transportation matching system 102, vehicle subsystems 1308, and networks 1304. As an example, and not by way of limitation, network environment 1300 may include multiple client device 1306, transportation matching system 102, vehicle subsystems 1308, and/or networks 1304.

This disclosure contemplates any suitable network 1304. As an example, and not by way of limitation, one or more portions of network 1304 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1304 may include one or more networks 1304.

Links may connect client device 1306, vehicle-icon-animation system 104, and vehicle subsystem 1308 to network 1304 or to each other. This disclosure contemplates any suitable links. In particular embodiments, one or more links include one or more wireline (such as for example Digital Subscriber Line ("DSL") or Data Over Cable Service Interface Specification ("DOC SIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1300. One or more first links may differ in one or more respects from one or more second links.

In particular embodiments, the client device 1306 may be an electronic device including hardware, software, or embedded logic components or a combination of two or more such components and capable of carrying out the appropriate functionalities implemented or supported by client device 1306. As an example, and not by way of limitation, a client device 1306 may include any of the computing devices discussed above in relation to FIG. 12. A client device 1306 may enable a network user at the client device 1306 to access network 1304. A client device 1306 may enable its user to communicate with other users at other client devices 1306.

In particular embodiments, the client device 1306 may include a requester application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 1306 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device 1306 one or more Hyper Text Markup Language ("HTML") files responsive to the HTTP request. The client device 1306 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, transportation matching system 102 may be a network-addressable computing system that can host a transportation matching network. The transportation matching system 102 may generate, store, receive, and send data, such as, for example, user-profile data, concept-profile data, text data, transportation request data, GPS location data, provider data, requester data, vehicle data, or other suitable data related to the transportation matching network. This may include authenticating the identity of providers and/or vehicles who are authorized to provide transportation services through the transportation matching system 102. In addition, the transportation matching system 102 may manage identities of service requesters such as users/requesters. In particular, the transportation matching system 102 may maintain requester data such as driving/riding histories, personal data, or other user data in addition to navigation and/or traffic management services or other location services (e.g., GPS services).

In particular embodiments, the transportation matching system 102 may manage transportation matching services to connect a user/requester with a vehicle and/or provider. By managing the transportation matching services, the transportation matching system 102 can manage the distribution and allocation of resources from vehicle systems and user resources such as GPS location and availability indicators, as described herein.

The transportation matching system 102 may be accessed by the other components of network environment 1300 either directly or via network 1304. In particular embodiments, the transportation matching system 102 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the transportation matching system 102 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1306, or a transportation matching system 102 to manage, retrieve, modify, add, or delete, the information stored in data store.

In particular embodiments, the transportation matching system 102 may provide users with the ability to take actions on various types of items or objects, supported by the transportation matching system 102. As an example, and not by way of limitation, the items and objects may include transportation matching networks to which users of the transportation matching system 102 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in the transportation matching system 102 or by an external system of a third-party system, which is separate from transportation matching system 102 and coupled to the transportation matching system 102 via a network 1304.

In particular embodiments, the transportation matching system 102 may be capable of linking a variety of entities. As an example, and not by way of limitation, the transportation matching system 102 may enable users to interact with each other or other entities, or to allow users to interact with these entities through an application programming interfaces ("API") or other communication channels.

In particular embodiments, the transportation matching system 102 may include a variety of servers, sub-systems, programs, modules, logs, and data stores. In particular embodiments, the transportation matching system 102 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile (e.g., provider profile or requester profile) store, connection store, third-party content store, or location store. The transportation matching system 102 may also include suitable components such as network interfaces, security mechanisms, load balancers, failover servers, management-and-network-operations consoles, other suitable components, or any suitable combination thereof. In particular embodiments, the transportation matching system 102 may include one or more user-profile stores for storing user profiles for transportation providers and/or transportation requesters. A user profile may include, for example, biographic information, demographic information, behavioral information, social information, or other types of descriptive information, such as interests, affinities, or location.

The web server may include a mail server or other messaging functionality for receiving and routing messages between the transportation matching system 102 and one or more client devices 1306. An action logger may be used to receive communications from a web server about a user's actions on or off the transportation matching system 102. In conjunction with the action log, a third-party-content-object log may be maintained of user exposures to third-party-content objects. A notification controller may provide information regarding content objects to a client device 1306. Information may be pushed to a client device 1306 as notifications, or information may be pulled from client device 1306 responsive to a request received from client device 1306. Authorization servers may be used to enforce one or more privacy settings of the users of the transportation matching system 102. A privacy setting of a user determines how particular information associated with a user can be shared. The authorization server may allow users to opt in to or opt out of having their actions logged by the transportation matching system 102 or shared with other systems, such as, for example, by setting appropriate privacy settings. Third-party-content-object stores may be used to store content objects received from third parties. Location stores may be used for storing location information received from client devices 1306 associated with users.

In addition, the vehicle subsystem 1308 can include a human-operated vehicle or an autonomous vehicle. A provider of a human-operated vehicle can perform maneuvers to pick up, transport, and drop off one or more requesters according to the embodiments described herein. In certain embodiments, the vehicle subsystem 1308 can include an autonomous vehicle—i.e., a vehicle that does not require a human operator. In these embodiments, the vehicle subsystem 1308 can perform maneuvers, communicate, and otherwise function without the aid of a human provider, in accordance with available technology.

In particular embodiments, the vehicle subsystem 1308 may include one or more sensors incorporated therein or associated thereto. For example, sensor(s) can be mounted on the top of the vehicle subsystem 1308 or else can be located within the interior of the vehicle subsystem 1308. In certain embodiments, the sensor(s) can be located in multiple areas at once—i.e., split up throughout the vehicle subsystem 1308 so that different components of the sensor(s) can be placed in different locations in accordance with optimal operation of the sensor(s). In these embodiments, the sensor(s) can include motion-related components such as an inertial measurement unit ("IMU") including one or more accelerometers, one or more gyroscopes, and one or more magnetometers. The sensor(s) can additionally or alternatively include a wireless IMU ("WIMU"), one or more cameras, one or more microphones, or other sensors or data input devices capable of receiving and/or recording information relating to navigating a route to pick up, transport, and/or drop off a requester.

In particular embodiments, the vehicle subsystem 1308 may include a communication device capable of communicating with the client device 1306 and/or the vehicle-icon-animation system 104. For example, the vehicle subsystem 1308 can include an on-board computing device communicatively linked to the network 1304 to transmit and receive data such as GPS location information, sensor-related information, requester location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   identifying predicted location points for a public transportation vehicle traveling along a predicted route;
   based on the predicted location points, determining a render orientation for the public transportation vehicle at a predicted current location along the predicted route;
   providing for display, within a graphical map display, a vehicle icon representing the public transportation vehicle traveling along the predicted route and pointing in the render orientation at the predicted current location; and
   in response to identifying an updated location point outside of a threshold of the predicted location points, providing for display, within the graphical map display, the vehicle icon representing the public transportation vehicle traveling according to the updated location point and pointing in an updated render orientation.

2. The computer-implemented method of claim 1, wherein identifying the predicted location points comprises:
   identifying transit information comprising a location and a bearing of a public transportation vehicle; and
   generating, from the transit information, predicted locations at predicted times for the predicted location points.

3. The computer-implemented method of claim 1, wherein identifying the predicted location points comprises:
   generating a polyline reflecting a predicted route of the public transportation vehicle; and
   projecting the predicted location points onto the polyline reflecting the predicted route.

4. The computer-implemented method of claim 3, wherein identifying the predicted location points comprises:
   identifying transit information comprising a location, a bearing, and a speed of the public transportation vehicle; and
   projecting the predicted location points onto the polyline reflecting the predicted route based on the location, the bearing, and the speed of the public transportation vehicle.

5. The computer-implemented method of claim 1, wherein determining the render orientation comprises:
   selecting a predicted location point, from the predicted location points, within a threshold distance of the predicted current location of the public transportation vehicle; and
   determining the render orientation based on the predicted current location and the predicted location point.

6. The computer-implemented method of claim 1, further comprising determining that the updated location point falls outside of the threshold of the predicted location points by:
   receiving updated transit information comprising an updated location of the public transportation vehicle; and
   comparing the updated location of the public transportation vehicle with one or more of the predicted location points utilizing the threshold.

7. The computer-implemented method of claim 1, further comprising:
   determining that an initial updated location point falls within the threshold of the predicted location points; and
   utilizing the predicted location points instead of the initial updated location point to provide the vehicle icon for display within the graphical map display.

8. The computer-implemented method of claim 1, further comprising determining the updated location point by receiving GPS data from a mobile device of a passenger riding on the public transportation vehicle.

9. A non-transitory computer readable medium comprising instructions that, when executed by at least one processor, cause a computing device to:
identify predicted location points for a public transportation vehicle traveling along a predicted route;
based on the predicted location points, determine a render orientation for the public transportation vehicle at a predicted current location along the predicted route;
provide for display, within a graphical map display, a vehicle icon representing the public transportation vehicle traveling along the predicted route and pointing in the render orientation at the predicted current location; and
in response to identifying an updated location point outside of a threshold of the predicted location points, provide for display, within the graphical map display, the vehicle icon representing the public transportation vehicle traveling according to the updated location point and pointing in an updated render orientation.

10. The non-transitory computer readable medium of claim 9, further comprising instructions that, when executed by the at least one processor, cause the computing device to identify the predicted location points by:
identifying transit information comprising a location and a bearing of a public transportation vehicle; and
generating, from the transit information, predicted locations at predicted times for the predicted location points.

11. The non-transitory computer readable medium of claim 9, further comprising instructions that, when executed by the at least one processor, cause the computing device to identify the predicted location points by:
generating a polyline reflecting a predicted route of the public transportation vehicle; and
projecting the predicted location points onto the polyline reflecting the predicted route.

12. The non-transitory computer readable medium of claim 9, further comprising instructions that, when executed by the at least one processor, cause the computing device to determine the render orientation by:
selecting a predicted location point, from the predicted location points, within a threshold distance of the predicted current location of the public transportation vehicle; and
determining the render orientation based on the predicted current location and the predicted location point.

13. The non-transitory computer readable medium of claim 9, further comprising instructions that, when executed by the at least one processor, cause the computing device to determine that the updated location point falls outside of the threshold of the predicted location points by:
receiving updated transit information comprising an updated location of the public transportation vehicle; and
comparing the updated location of the public transportation vehicle with one or more of the predicted location points utilizing the threshold.

14. A system comprising:
at least one processor; and
a non-transitory computer readable medium comprising instructions that, when executed by the at least one processor, cause the system to:
identify predicted location points for a public transportation vehicle traveling along a predicted route;
based on the predicted location points, determine a render orientation for the public transportation vehicle at a predicted current location along the predicted route;
provide for display, within a graphical map display, a vehicle icon representing the public transportation vehicle traveling along the predicted route and pointing in the render orientation at the predicted current location; and
in response to identifying an updated location point outside of a threshold of the predicted location points, provide for display, within the graphical map display, the vehicle icon representing the public transportation vehicle traveling according to the updated location point and pointing in an updated render orientation.

15. The system of claim 14, further comprising instructions that, when executed by the at least one processor, cause the system to identify the predicted location points by:
identifying transit information comprising a location and a bearing of a public transportation vehicle; and
generating, from the transit information, predicted locations at predicted times for the predicted location points.

16. The system of claim 14, further comprising instructions that, when executed by the at least one processor, cause the system to identify the predicted location points by:
generating a polyline reflecting a predicted route of the public transportation vehicle; and
projecting the predicted location points onto the polyline reflecting the predicted route.

17. The system of claim 16, further comprising instructions that, when executed by the at least one processor, cause the system to identify the predicted location points by:
identifying transit information comprising a location, a bearing, and a speed of the public transportation vehicle; and
projecting the predicted location points onto the polyline reflecting the predicted route based on the location, the bearing, and the speed of the public transportation vehicle.

18. The system of claim 14, further comprising instructions that, when executed by the at least one processor, cause the system to determine the render orientation by:
selecting a predicted location point, from the predicted location points, within a threshold distance of the predicted current location of the public transportation vehicle; and
determining the render orientation based on the predicted current location and the predicted location point.

19. The system of claim 14, further comprising instructions that, when executed by the at least one processor, cause the system to determine that the updated location point falls outside of the threshold of the predicted location points by:
receiving updated transit information comprising an updated location of the public transportation vehicle; and
comparing the updated location of the public transportation vehicle with one or more of the predicted location points utilizing the threshold.

20. The system of claim 14, further comprising instructions that, when executed by the at least one processor, cause the system to:
determine that an initial updated location point falls within the threshold of the predicted location points; and utilize the predicted location points instead of the initial updated location point to provide the vehicle icon for display within the graphical map display.

* * * * *